US010721195B2

(12) United States Patent
Jakobsson

(10) Patent No.: US 10,721,195 B2
(45) Date of Patent: Jul. 21, 2020

(54) DETECTION OF BUSINESS EMAIL COMPROMISE

(71) Applicant: ZapFraud, Inc., Portola Valley, CA (US)

(72) Inventor: Bjorn Markus Jakobsson, Portola Valley, CA (US)

(73) Assignee: ZapFraud, Inc., Portola Valley, CA (US)

(*) Notice: Subject to any disclaimer, the term of this patent is extended or adjusted under 35 U.S.C. 154(b) by 131 days.

(21) Appl. No.: 15/414,489

(22) Filed: Jan. 24, 2017

(65) Prior Publication Data
US 2017/0230323 A1 Aug. 10, 2017

Related U.S. Application Data

(60) Provisional application No. 62/287,378, filed on Jan. 26, 2016.

(51) Int. Cl.
*H04L 29/06* (2006.01)
*H04L 12/58* (2006.01)

(52) U.S. Cl.
CPC .............. *H04L 51/12* (2013.01); *H04L 51/28* (2013.01); *H04L 51/38* (2013.01); *H04L 63/0227* (2013.01); *H04L 63/08* (2013.01); *H04L 63/083* (2013.01); *H04L 63/145* (2013.01); *H04L 63/1433* (2013.01); *H04L 63/1483* (2013.01); *H04L 2463/082* (2013.01)

(58) Field of Classification Search
None
See application file for complete search history.

(56) References Cited

U.S. PATENT DOCUMENTS

| 6,161,130 | A | 12/2000 | Horvitz |
| 6,574,658 | B1 | 6/2003 | Gabber |
| 6,721,784 | B1 | 4/2004 | Leonard |

(Continued)

FOREIGN PATENT DOCUMENTS

WO 2017/132170 A1 8/2017

OTHER PUBLICATIONS

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

(Continued)

*Primary Examiner* — Shin-Hon (Eric) Chen
(74) *Attorney, Agent, or Firm* — Schwabe Williamson & Wyatt, PC

(57) ABSTRACT

Detecting scam is disclosed. A sender, having a first email address, is associated with a set of secondary contact data items. The set of secondary contact data items comprises at least one of a phone number, a second email address, and an instant messaging identifier. It is determined that an email message purporting to originate from the sender's first email address has been sent to a recipient. Prior to allowing access by the recipient to the email message, it is requested, using at least one secondary contact item, that the sender confirm that the email message was indeed originated by the sender. In response to receiving a confirmation from the sender that the sender did originate the email message, the email message is delivered to the recipient.

18 Claims, 19 Drawing Sheets

(56) References Cited

U.S. PATENT DOCUMENTS

| | | |
|---|---|---|
| 7,293,063 B1 | 11/2007 | Sobel |
| 7,299,261 B1 | 11/2007 | Oliver |
| 7,644,274 B1 | 1/2010 | Jakobsson |
| 7,809,795 B1 | 10/2010 | Cooley |
| 7,814,545 B2 | 10/2010 | Oliver |
| 7,899,213 B2 | 3/2011 | Otsuka |
| 7,899,866 B1 | 3/2011 | Buckingham |
| 7,917,655 B1 | 3/2011 | Coomer |
| 8,010,614 B1 | 8/2011 | Musat |
| 8,131,655 B1 | 3/2012 | Cosoi |
| 8,255,572 B1 | 8/2012 | Coomer |
| 8,484,741 B1* | 7/2013 | Chapman ........... G06Q 10/0635 726/25 |
| 8,489,689 B1 | 7/2013 | Sharma |
| 8,566,938 B1 | 10/2013 | Prakash |
| 8,667,069 B1 | 3/2014 | Connelly |
| 8,719,940 B1 | 5/2014 | Higbee |
| 8,752,172 B1 | 6/2014 | Dotan |
| 8,832,202 B2 | 9/2014 | Yoshioka |
| 8,984,640 B1 | 3/2015 | Emigh |
| 9,060,057 B1 | 6/2015 | Danis |
| 9,154,514 B1* | 10/2015 | Prakash .............. H04L 63/1483 |
| 9,245,115 B1 | 1/2016 | Jakobsson |
| 9,277,049 B1 | 3/2016 | Danis |
| 9,338,287 B1 | 5/2016 | Russo |
| 9,471,714 B2 | 10/2016 | Iwasaki |
| 9,473,437 B1 | 10/2016 | Jakobsson |
| 2002/0138271 A1 | 9/2002 | Shaw |
| 2003/0023736 A1 | 1/2003 | Abkemeier |
| 2003/0229672 A1 | 12/2003 | Kohn |
| 2003/0236845 A1 | 12/2003 | Pitsos |
| 2004/0176072 A1 | 9/2004 | Gellens |
| 2004/0177120 A1 | 9/2004 | Kirsch |
| 2004/0203589 A1 | 10/2004 | Wang |
| 2005/0033810 A1 | 2/2005 | Malcolm |
| 2005/0060643 A1 | 3/2005 | Glass |
| 2005/0076084 A1 | 4/2005 | Loughmiller |
| 2005/0080857 A1 | 4/2005 | Kirsch |
| 2005/0182735 A1 | 8/2005 | Zager |
| 2005/0188023 A1 | 8/2005 | Doan |
| 2005/0210106 A1* | 9/2005 | Cunningham ....... G06Q 10/107 709/206 |
| 2005/0216587 A1 | 9/2005 | John |
| 2005/0223076 A1 | 10/2005 | Barrus |
| 2005/0235065 A1 | 10/2005 | Le |
| 2005/0257261 A1 | 11/2005 | Shraim |
| 2006/0004772 A1 | 1/2006 | Hagan |
| 2006/0015563 A1 | 1/2006 | Judge |
| 2006/0026242 A1 | 2/2006 | Kuhlmann |
| 2006/0031306 A1 | 2/2006 | Haverkos |
| 2006/0053490 A1 | 3/2006 | Herz |
| 2006/0149821 A1 | 7/2006 | Rajan |
| 2006/0168329 A1 | 7/2006 | Tan |
| 2006/0195542 A1 | 8/2006 | Nandhra |
| 2006/0206713 A1 | 9/2006 | Hickman |
| 2006/0224677 A1 | 10/2006 | Ishikawa |
| 2006/0253597 A1* | 11/2006 | Mujica ................ G06Q 10/107 709/229 |
| 2006/0259558 A1 | 11/2006 | Yen |
| 2006/0265498 A1 | 11/2006 | Turgeman |
| 2007/0019235 A1 | 1/2007 | Lee |
| 2007/0027992 A1 | 2/2007 | Judge |
| 2007/0101423 A1 | 5/2007 | Oliver |
| 2007/0107053 A1 | 5/2007 | Shraim |
| 2007/0130618 A1 | 6/2007 | Chen |
| 2007/0143432 A1 | 6/2007 | Klos |
| 2007/0192169 A1 | 8/2007 | Herbrich |
| 2007/0198642 A1 | 8/2007 | Malik |
| 2007/0239639 A1 | 10/2007 | Loughmiller |
| 2007/0271343 A1 | 11/2007 | George |
| 2007/0299916 A1 | 12/2007 | Bates |
| 2008/0004049 A1 | 1/2008 | Yigang |
| 2008/0046970 A1 | 2/2008 | Oliver |
| 2008/0050014 A1 | 2/2008 | Bradski |
| 2008/0104235 A1 | 5/2008 | Oliver |
| 2008/0141374 A1 | 6/2008 | Sidiroglou |
| 2008/0175266 A1 | 7/2008 | Alperovitch |
| 2008/0178288 A1 | 7/2008 | Alperovitch |
| 2008/0235794 A1 | 9/2008 | Bogner |
| 2008/0276315 A1 | 11/2008 | Shuster |
| 2008/0290154 A1 | 11/2008 | Barnhardt |
| 2008/0313704 A1* | 12/2008 | Sivaprasad ............ H04L 51/12 726/2 |
| 2009/0064330 A1 | 3/2009 | Shraim |
| 2009/0089859 A1 | 4/2009 | Cook |
| 2009/0210708 A1 | 8/2009 | Chou |
| 2009/0217370 A1* | 8/2009 | Hulten ................... G06F 21/51 726/16 |
| 2009/0228583 A1 | 9/2009 | Pocklington |
| 2009/0252159 A1 | 10/2009 | Lawson |
| 2009/0292781 A1 | 11/2009 | Teng |
| 2009/0319629 A1 | 12/2009 | De Guerre |
| 2010/0030798 A1 | 2/2010 | Kumar |
| 2010/0043071 A1 | 2/2010 | Wang |
| 2010/0070761 A1 | 3/2010 | Gustave |
| 2010/0115040 A1 | 5/2010 | Sargent |
| 2010/0145900 A1 | 6/2010 | Zheng |
| 2010/0250929 A1* | 9/2010 | Schultz ................. H04L 63/083 713/168 |
| 2010/0287246 A1 | 11/2010 | Klos |
| 2010/0299399 A1 | 11/2010 | Wanser |
| 2010/0313253 A1 | 12/2010 | Reiss |
| 2011/0060802 A1* | 3/2011 | Katsikas .............. G06Q 10/107 709/206 |
| 2011/0087485 A1 | 4/2011 | Maude |
| 2011/0191847 A1 | 8/2011 | Davis |
| 2011/0271349 A1 | 11/2011 | Kaplan |
| 2012/0030293 A1 | 2/2012 | Bobotek |
| 2012/0167233 A1 | 6/2012 | Gillum |
| 2012/0227104 A1 | 9/2012 | Sinha |
| 2012/0246725 A1 | 9/2012 | Osipkov |
| 2012/0278694 A1 | 11/2012 | Washio |
| 2012/0278887 A1* | 11/2012 | Vitaldevara .......... G06Q 10/107 726/23 |
| 2013/0067012 A1 | 3/2013 | Matzkel |
| 2013/0081142 A1 | 3/2013 | McDougal |
| 2013/0083129 A1 | 4/2013 | Thompson |
| 2013/0128883 A1 | 5/2013 | Lawson |
| 2013/0346528 A1 | 12/2013 | Shinde |
| 2014/0230061 A1 | 8/2014 | Higbee |
| 2014/0250506 A1 | 9/2014 | Hallam-Baker |
| 2015/0030156 A1 | 1/2015 | Perez |
| 2015/0067833 A1 | 3/2015 | Verma |
| 2015/0067839 A1* | 3/2015 | Wardman ............ H04L 63/1483 726/22 |
| 2015/0081722 A1 | 3/2015 | Terada |
| 2016/0104132 A1 | 4/2016 | Abbatiello |
| 2017/0091274 A1 | 3/2017 | Guo |
| 2017/0200015 A1* | 7/2017 | Gonzalez ............... G06F 21/604 |
| 2017/0206545 A1* | 7/2017 | Gupta ................ G06Q 30/0226 |

OTHER PUBLICATIONS

Author Unknown, "BABASTIK: AntiSpam Personal", downloaded from "https://web.archive.org/web/20101031061734/babastik.com/AntiSpam-Personal/", Oct. 31, 2010.

Author Unknown, "bluebottle—trusted delivery", downloaded from "https://web.archive.org/web/20140715223712/https://bluebottle.com/trusted-delivery.php", Jul. 15, 2014.

Author Unknown, "First of all, Your Software Is Excellent", downloaded from "https://web.archive.org/web/20120182074130/http://www.spamresearchcenter.com/", Aug. 12, 2012.

Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.

Author Unknown, "Junk Mail Buffering Agent", downloaded from http://www.ivarch.com/programs/jmba.shtml, Jun. 2005.

Author Unknown, "No Software to Install", downloaded from "https://web.archive.org/web/201002095356/http://www.cleanmymailbox.com:80/howitworks.html", Oct. 2, 2010.

(56) References Cited

OTHER PUBLICATIONS

Author Unknown, "Rejecting spam with a procmail accept list", downloaded from "https://web.archive.org/web/20160320083258/http:/angel.net/~nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.softwaredevelopment.net.au:80/pge_steven.htm", Jun. 7, 2014.
Author Unknown, 0Spam.com, Frequently Asked Questions, downloaded from "https://web.archive.org/web/20150428181716/http://www.0spam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "https://web.archive.org/web/20150813112933/http:/clifford.ac/software.html", Aug. 13, 2015.
Author Unknown, ASB AntiSpam official home page, downloaded from "https://web.archive.org/web/20080605074520/http://asbsoft.netwu.com:80/index.html", Jun. 5, 2008.
Author Unknown, Boxbe, Wikipedia, Nov. 17, 2016, https://en.wikipedia.org/wiki/Boxbe?wprov=sfsi1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, CAPTCHA: Telling Humans and Computers Apart Automatically, downloaded from "https://web.archive.org/web/20160124075223/http:/www.captcha.net/", Jan. 24, 2016.
Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.
Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69PKU5", May 20, 2015.
Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.
Author Unknown, Home Page For "Countering Spam with Ham-Authenticated Email and the Guarded Email Protocol", downloaded from https://web.archive.org/web/20150913075130/http:/www.dwheeler.com/guarded-email/, Sep. 13, 2015.
Author Unknown, Home: About.com, downloaded from "https://web.archive.org/web/20110201205543/quarantinemail.com/" Feb. 1, 2011.
Author Unknown, How ChoiceMail Works, downloaded from "https://web.archive.org/web/20160111013759/http://www.digiportal.com:80/products/how-choicemail-works.html", Jan. 11, 2016.
Author Unknown, How Mail Unknown works., downloaded from "https://web.archive.org/web/20100123200126/http://www.mailunknown.com:80/HowMailUnknownWorks.asp#VerifyValidate", Jan. 23, 2010.
Author Unknown, Joe Maimon—Sendmail Page, downloaded from "https://web.archive.org/web/20150820074626/http:/www.jmaimon.com/sendmail/" Aug. 20, 2015.

Author Unknown, Kens Spam Filter 1.40, downloaded from "https://web.archive.org/web/20080317184558/http://www.kensmail.net:80/spam.html", Mar. 17, 2008.
Author Unknown, mailcircuit.com, Secure: Spam Protection, downloaded from "https://web.archive.org/web/20131109042243/http:/www.mailcircuit.com/secure/", Nov. 9, 2013.
Author Unknown, mailDuster, Tour 1: Show me how mailDuster blocks spam, downloaded from "https://web.archive.org/web/20070609210003/http://www.mailduster.com:80/tour1.phtml", Jun. 9, 2007.
Author Unknown, mailDuster, Tour 2: But how do my friends and colleagues send me email?, downloaded from "https://web.archive.org/web/20070609210039/http://www.mailduster.com:80/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.
Author Unknown, PermitMail, Products: The most advanced email firewall available for your business, downloaded from "https://web.archive.org/web/20160219151855/http://ipermitmail.com/products/", Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge and Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm—How it works, downloaded from https://web.archive.org/web/20150915060329/http:/smarden.org/qconfirm/technical.html, Sep. 15, 2015.
Author Unknown, RSF Mail Agent, Nov. 17, 2016, http://theory.csail.mit.edu/~rivest/rsf.
Author Unknown, Say Goodbye to Email Overload, downloaded from "https://web.archive.org/web/20160119092844/http://www.boxbe.com:80/how-it-works", Jan. 19, 2016.
Author Unknown, sendio, "Inbox Security. Threats eliminated with a layered technology approach.", downloaded from "https://web.archive.org/web/20140213192151/http:/www.sendio.com/solutions/security/", Feb. 13, 2014.
Author Unknown, Spam Pepper, Combatting Net Spam, downloaded from "https://web.archive.org/web/20141002210345/http://www.spampepper.com:80/spampepper-com/", Oct. 2, 2014.
Author Unknown, Spam Snag, Stop Unsolicited Emails forever!, downloaded from "https://web.archive.org/web/20081220202500/http://www.spamsnag.com:80/how.php", Dec. 20, 2008.
Author Unknown, Spam: Overview, downloaded from "https://web.archive.org/web/20090107024207/http:/www.spamwall.net/products.htm", Jan. 7, 2009.
Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.
Author Unknown, SpamCerbere.com, downloaded from "https://web.archive.org/web/20070629011221/http:/www.spamcerbere.com:80/en/howitworks.php", Jun. 29, 2007.

(56) References Cited

OTHER PUBLICATIONS

Author Unknown, SPAMjadoo: Ultimate Spam Protection, downloaded from "https://web.archive.org/web/20140512000636/http://www.spamjadoo.com:80/esp-explained.htm" May 12, 2014.
Author Unknown, SpamKilling, "What is AntiSpam?", downloaded from "https://web.archive.org/web/20100411141933/http:/www.spamkilling.com:80/home_html.htm", Apr. 11, 2010.
Author Unknown, SpamRestraint.com: How does it work?, downloaded from "https://web.archive.org/web/20050206071926/http://www.spamrestraint.com:80/moreinfo.html", Feb. 6, 2005.
Author Unknown, Tagged Message Delivery Agent (TMDA), downloaded from "http://web.archive.org/web/20160122072207/http://www.tmda.net/", Jan. 22, 2016.
Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.
Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.
Author Unknown, V@nquishLabs, How it Works: Features, downloaded from "https://web.archive.org/web/20081015072416/http://vanquish.com/features/features_how_it_works.shtml", Oct. 15, 2008.
Author Unknown, What is Auto Spam Killer, downloaded from "https://web.archive.org./web/20090215025157/http://knockmail.com:80/support/descriptionask.html", Feb. 15, 2009.
Author Unknown, White List Email (WLE), downloaded from "https://web.archive.org/web/20150912154811/http:/www.rfc1149.net/devel/wle.html", Sep. 12, 2015.
Brad Templeton, "Proper principles for Challenge/Response anti-spam systems", downloaded from "http://web.archive.org/web/2015090608593/http://www.templetons.com/brad/spam/challengeresponse.html", Sep. 6, 2015.
Danny Sleator, "Blowback: A Spam Blocking System", downloaded from "https://web.archive.org/web/20150910031444/http://www.cs.cmu.edu/~sleator/blowback", Sep. 10, 2015.
David A. Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.
David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.
Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.
James Thornton, "Challenge/Response at the SMTP Level", downloaded from "https://web.archive.org/web/20140215111642/http://original.jamesthornton.com/writing/challenge-response-at-smtp-level.html", Feb. 15, 2014.
Marco Paganini, Active Spam Killer, "How It Works", downloaded from "https://web.archive.org/web/20150616133020/http:/a-s-k.sourceforge.net:80/howitworks.html", Jun. 16, 2015.
Peter Simons, "mapSoN 3.x User's Manual", downloaded from "https://web.archive.org/web/20140626054320/http:/mapson.sourceforge.net/", Jun. 26, 2014.
Ronald L. Rivest, "RSF Quickstart Guide", Sep. 1, 2004.
Patent Cooperation Treaty: International Search Report for PCT/US2017/014776 dated May 23, 2017; 4 pages.
Patent Cooperation Treaty: Written Opinion for PCT/US2017/014776 dated May 23, 2017; 6 pages.
A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.
Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.
Author Unknown, "Federal Court Denies Attempt by Mailblocks, Inc. To Shut Down Spamarrest LLC", downloaded from "http://www.spamarrest.com/pr/releases/20030611.jsp", Seattle, WA, Jun. 11, 2003.
Bjorn Markus Jakobsson, U.S. Appl. No. 14/487,989 entitled "Detecting Phishing Attempts" filed Sep. 16, 2014.
Bjorn Markus Jakobsson, U.S. Appl. No. 14/535,064 entitled "Validating Automatic Number Identification Data" filed Nov. 6, 2014.
Bjorn Markus Jakobsson, U.S. Appl. No. 15/235,058 entitled "Tertiary Classification of Communications", filed Aug. 11, 2016.
E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.
Karsten M. Self, "Challenge-Response Anti-Spam Systems Considered Harmful", downloaded from "ftp://linuxmafia.com/faq/Mail/challenge-response.html", last updated Dec. 29, 2003.
M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.
NIST. Usability of Security. http://csrc.nist.gov/security-usability/HTML/research.html.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.

* cited by examiner

1401

Did you just send an email with subject line "Invoice for March" to Alice @company.com? If so, you need to click [here] to have the email delivered. If you did not send the message, no action is needed. —1402

Thanks for confirming. Your message will now be delivered. For security reasons, we request that you register a secondary email address and/or a phone number. We will use those only to request you to confirm that you sent messages. Registering will help you and your correspondents stay safe.

Enter Secondary Email Address:

[                                ] —1411

Enter Phone Number:

Did you just send an email with subject line "Invoice for March" to Alice @company.com? If so, you need to click here or reply to this message with an answer "yes" for your email to be delivered.

Our apologies for the trouble, but this will improve the security against email based scams. Thanks for helping!

FIG. 15

DETECTION OF BUSINESS EMAIL COMPROMISE

CROSS REFERENCE TO OTHER APPLICATIONS

This application claims priority to U.S. Provisional Patent Application No. 62/287,378 entitled DETECTION OF BUSINESS EMAIL COMPROMISE filed Jan. 26, 2016 which is incorporated herein by reference for all purposes.

BACKGROUND OF THE INVENTION

Business Email Compromise (BEC) is a type of scam that has increased dramatically in commonality in the recent past. In January 2015, the FBI released stats showing that between Oct. 1, 2013 and Dec. 1, 2014, some 1,198 companies reported having lost a total of $179 million in BEC scams, also known as "CEO fraud." It is likely that many companies do not report being victimized, and that the actual numbers are much higher. There therefore exists an ongoing need to protect users against such scams.

BRIEF DESCRIPTION OF THE DRAWINGS

Various embodiments of the invention are disclosed in the following detailed description and the accompanying drawings.

FIG. 14 illustrates an example embodiment of a request.

FIG. 15 illustrates an example embodiment of a request.

DETAILED DESCRIPTION

Figure 1:
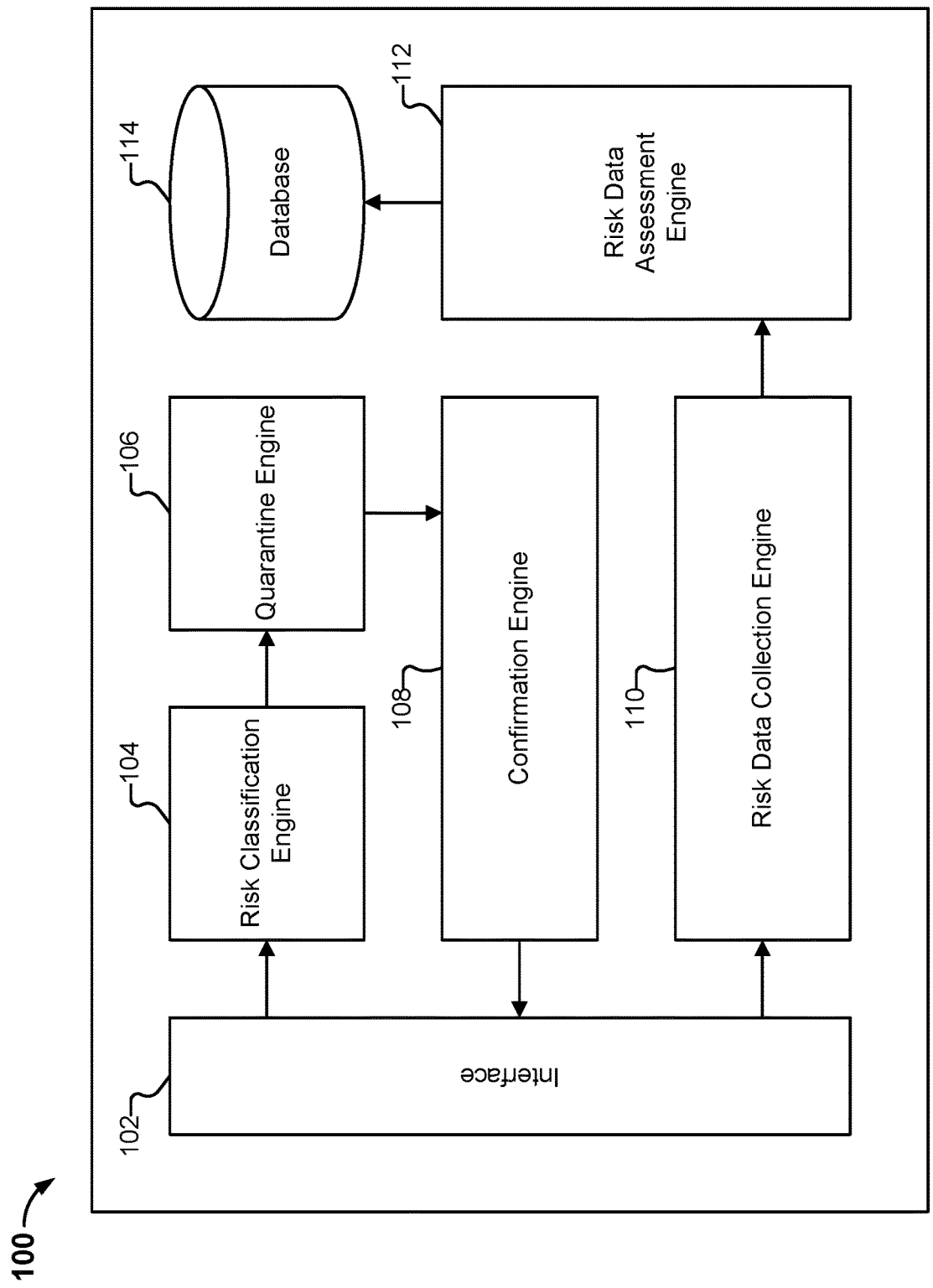
FIG. 1 is a block diagram illustrating an embodiment of a system for detecting scam.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A BEC scam usually begins with the thieves either phishing an executive and gaining access to that individual's inbox, or emailing employees from a lookalike domain name that is, for example, one or two letters off from the target company's true domain name. For example, if the target company's domain was "example.com" the thieves might register "example.com" (substituting the letter "L" with the numeral 1) or "example.co," and send messages from that domain. Other times, the thieves will spoof an email, e.g., using a mail server setup to act as an open relay, which permits them to send bogus emails with a real domain name that is not theirs. Yet other times, the thieves may create a personal email account with a user name suggesting that the email account belongs to the CEO, and then email the CEO's secretary with a request. Commonly, the thieves request that the recipient transfer money for some business transaction. In many cases, the thieves have studied the targeted organization well enough to know what kind of request will seem reasonable, making them likely to be more successful. For example, a thief can gain access to an internal email account, like the CEO's, and find a previous legitimate invoice that is then modified to become a scam.

Other, technically similar scams also face consumers. One example of this is the so-called "stranded traveler scam", which typically involves a friend of the victim who was robbed in a foreign country and needs a quick loan to get home. Other related scams include scams where young adults supposedly are jailed in a foreign country, and need help from grandparents. Many times, scams like these use accounts that have been compromised, e.g., in phishing attacks. Sometimes, spoofing is used, or other methods of deceit, including registration of email accounts with names related to the person in supposed need. What is common for all of these scams is that they use deception, and commonly take advantage of pre-existing trust relationships between the intended victim and the party in supposed need.

When BEC scams are referred to in this document, they refer to the collection of scams that have the general format of the BEC scam, which includes but is not limited to stranded traveler scams, imprisoned in Mexico scams, phishing emails, and other emails that suggest familiarity, authority, friendship or other relationship. Many targeted scams fall in this category, and scams of these types can be addressed by using the techniques described herein.

Unlike traditional phishing scams, spoofed emails used in CEO fraud schemes and related scams, such as those described above, are unlikely to set off traditional spam filters, because these are targeted phishing scams that are not mass emailed, and common spam filters rely heavily on the quantity of email of a certain type being sent. Also, the crooks behind them take the time to understand the target organization's relationships, activities, interests and travel and/or purchasing plans. This makes the scam emails look rather realistic—both to their recipients and to traditional spam filters.

Traditional spam filtering is designed to detect typical spam. This is typically sent in high volume, has low open rates, and even lower response rates. It is commonly placed in the spam folder by the recipient (if not already done so by the spam filter). It commonly contains a small set of keywords, corresponding to the products that are most profitable for spammers to sell. These keywords are typically not used in non-spam email traffic. To avoid detection by spam filters, spammers commonly obfuscate messages, e.g., write V-!-@-G.R-A instead of "Viagra". This commonly helps the spammers circumvent spam filters, but the message is typically still clear to the recipient.

In contrast, a typical BEC scam message is sent to only a small number of targeted recipients, such as one or two recipients within an organization. If similar messages are sent to recipients in other organizations, those are typically not verbatim copies, as there is a fair amount of customization, much of which is guided by contextual information obtained from data breaches, compromised accounts, and publicly available information, including social networks. There are typically no keywords specific to BEC emails—instead, BEC scammers attempt to mimic the typical emails of the people they interact with. As a result, there is typically no need for obfuscation. BEC scammers may purchase or register new domain names, like example.com above, solely for the purpose of deceiving users within one specific organization targeted by the scammer, and may spend a significant amount of effort customizing their emails to make them credible, based on contextual information related to the intended victims. These factors contribute to make traditional/existing spam filters fail to detect BEC scam emails.

In some embodiments, the techniques described herein address the problems of email scams, such as BEC scams, using a set of detection components. While example embodiments involving email are described below, the techniques described herein can variously be adapted to accommodate any type of communication channel, such as chat, (e.g., instant messaging (IM)), text (e.g., short message service (SMS)), etc., as applicable.

In various embodiments, the detection components include, but are not limited to, components to detect deceptive email content; to detect deceptive domains; to detect deceptive email addresses; to detect email header structures associated with deceptive practices; to detect deceptive attachments; and to detect hyperlinked material that is associated with deceptive emails.

Furthermore, in some embodiments, the outputs of at least two deception detection components are combined in a way that limits error rates, for example, using a non-monotonic combining logic that triggers on combinations of the above described deception detection components. Further details regarding this logic will be described below. In some embodiments, the logic reduces error rates by mirroring scammer strategies and associated uses of approaches that cause the deception detection components to trigger. In some embodiments, this reduces false negatives. At the same time, in some embodiments, the logic reduces false positives by not blocking benevolent emails, even if these cause the triggering of deception detection components, for example, as long as these are not triggered according to patterns indicative of common scammer strategies.

As will be illustrated in further detail below, the techniques described herein mitigate the threat associated with Business Email Compromise and associated scams. In some embodiments, this is done by detecting structural persuasion attempts. In some embodiments, this is in contrast to verbal persuasion attempts, which include text-based appeals in the content portion of a message. In some embodiments, structural persuasion relates to use of deceptive header information intended to cause the recipient of an email to be inclined to accept a message as legitimate and safe.

In some embodiments, the use of second factor authentication (2FA) for confirmation is beneficial to avoid risk. For example, if Alice sends an email to her broker, Bob, asking Bob to sell some of her stock, then it can be beneficial for Bob to confirm with Alice before performing the sale. This avoids performing transactions as a result of attacks, such as a spoofing attack in which Eve is sending a spoofed message to Bob, appearing to come from Alice. It also mitigates the threat associated with malware and stolen computers. For example, consider a setting where Eve places malware on Alice's computer, causing an email to be sent from Alice to Bob, in which Bob is asked to sell some of Alice's stock. In these examples, using a 2FA for confirmation reduces the threat, as if Eve does not have the ability to receive the 2FA request and respond to it on Alice's behalf, then the email request will be ignored by Bob. In some embodiments, the 2FA confirmation requests include SMS messages or manually placed phone calls. Existing systems for sending 2FA confirmation requests are not automated. Instead, Bob reads his email from Alice, and determines in a case-by-case basis whether to initiate a 2FA confirmation request. Occasionally, Bob may make a mistake or be hurried by a high-priority request, thereby deciding to ignore the 2FA confirmation. Scammers may trick Bob to omit the request. In some embodiments, the techniques described herein automate the determination of when to send a 2FA confirmation request, and integrate the confirmation with the delivery of the email. This way, Bob will not receive the email from Alice until Alice has confirmed it, unless it is an email that does not require a confirmation, in which case it will be delivered immediately.

Traditional spam filters typically have a logic that is monotonically increasing. What this means is that they may have combining logic functions that generate a filtering decision from two or more detection components, such as one velocity detector and one reputation detector, and where a "higher" detection on either of these result in a higher probability of blocking the email. For example, the output of the velocity detector may be three levels, corresponding to low, medium, and high velocities. Similarly, the output of the reputation detector may be three levels, corresponding to low, medium, and high reputation risk. The combining logic function may determine that a message is undesirable if it results in a high velocity level, a high reputation risk level, or a medium level if both the velocity detector and the reputation detection components output medium levels. This traditional combining logic is monotonically increasing, and works in a way that can be described as "additive": if any filter outputs a "higher" detection score, that means that it is more likely that the email will be blocked, as individual scores from different detection components are combined in a way in which each score contributes toward reaching a threshold in a manner that does not depend on the other scores. If the threshold is reached, a filter action is performed.

In contrast, in one embodiment, the disclosed scam detector (also referred to herein as "the system") corresponds to a logic combination function that is not monotonically increasing. This type of function is referred to herein as "non-monotonically increasing." For example, suppose that a first and a second detector each have three possible outputs, which for illustrative purposes, are referred to as low, medium, and high. In some embodiments, the combining logic function determines that an email is not desirable if the first detector outputs high and the second detector outputs low; the first detector outputs low and the second detector outputs high; or both generate a medium output; but otherwise determines that the email is desirable. In this example, it is clear that neither detector generates an output from which a classification decision can be made without also taking the output of the other detector into consideration. It is also clear in this example that at least one of the detectors produces an output for which one value is not always indicative of a safe email, but sometimes that value is indicative of an unsafe email. Seen another way, in some embodiments, the results of the individual detectors are combined using a combining function whose operations depend on at least one of the scores and types of the individual detectors. In some embodiments, such a detector identifies what other detectors are relevant for the classification, and how to combine the scores and types from those.

While the above examples describe monotonically increasing and non-monotonically increasing functions in the context of email classification, the techniques described herein can be applied to more detectors than two, and to different types of detector outputs, such as binary detector outputs and detector outputs with more than three possible options. In some embodiments, the detector outputs are of different types for different detectors, such as a first detector with a binary output and a second detector with an output that can take ten different values. In some embodiments, the detector outputs can be represented as numeric values, Boolean values, class memberships, or any other appropriate types of values. Detectors can be implemented in software, hardware or a combination of these, and in some embodiments, may utilize some manual curation in cases where, for example, an automated classification is not supported by the system rules for a particular input email message.

The non-monotonic logic is described in further detail in the combining logic section below, where example pseudo-code is provided, illustrating an example embodiment of the techniques described herein. One example element of relevance to the non-monotonic evaluation is the classification of the sender being, or not being, a trusted party. In one embodiment, a trusted sender is what is defined as a "friend" or an "internal" party in the example embodiment below. In another embodiment, a trusted sender is a party who the recipient has an entry for in his or her address book; is connected to on a network (e.g., social network such as Facebook or LinkedIn); has chatted or placed phone/video calls using a communications application/program such as Skype or similar software; or a combination of such properties. In one example embodiment, two associated parties share a list of trusted parties; if one email sender is qualified as a trusted party for one of the associated parties, then the same email sender is also automatically or conditionally qualified as a trusted party for the second associated party. Possible example conditions include the two associated parties being members of the same organization; having configured their respective systems to allow for the exchange of information related to who is a trusted party; conditions relating to the certainty of the classification and a minimum required certainty configuration of the second associated party; and any combination of such conditions. Further details regarding determining what users are trusted are described below.

In some embodiments, the non-monotonic logic causes a different evaluation of messages sent from trusted senders and non-trusted senders. For example, in the example embodiment below, the presence of an untrusted reply-to address is associated with risk when it is part of a message from a trusted sender, but not from a non-trusted sender (e.g., from=bob@example.com is not the same as reply-to=bob@exampe.com). Similarly, in some embodiments, spoof indicators are associated with risk in a message from a trusted sender, but not from a non-trusted sender. Conversely, in some embodiments, deceptive links, deceptive attachments, deceptive domain names, deceptive email addresses, and the like are associated with risk primarily in messages from non-trusted parties. In other words, in some embodiments, the risk evaluation logic described herein is not "additive" in that the presence of an indicator implies greater risk in one context, while lesser risk in another context. In some embodiments, the non-monotonic logic associated with the risk evaluation maps to the business strategy of the scammers, where this business strategy corresponds to how they typically carry out their acts of trying to scam recipients.

Described herein are also techniques for determining when an email address is potentially deceptive. In some embodiments, a first component of this determination determines the similarity of two or more email addresses, using, for example, string comparison techniques specifically designed to compare email addresses and their associated display names with each other. In some embodiments, this comparison is made with respect to display name, user name, domain, TLD, and/or any combinations of these, where two addresses can be compared with respect to at least one such combination, which can include two or more. In some embodiments, this first component also includes techniques to match conceptually similar strings to each other, where the two strings may not be similar in traditional aspects. For example, the words "Bill" and "William" are not closely related in a traditional string-comparison sense; however, they are conceptually related since people named "William" are often called "Bill". Therefore, an email address with a display name "Bill" has a similar meaning to an email address with a display name "William", even though the two are not similar in a traditional string comparison sense. Furthermore, the words "mom" and "morn" are not very similar in a traditional string comparison sense, since one is a three-letter word and the other a five-letter word, and these two words only have one letter in common. However, they are visually related since "m" looks similar to "rn". This similarity may be greater for some fonts than for other, which is another aspect that is considered in one embodiment. In some embodiments, a string comparison technique that adds conceptual similarity detection to traditional string comparison improves the ability to detect deceptive email addresses. This can also include the use of unicode character sets to create homographs, which are characters that look like other characters, and which can be confused with those.

In some embodiments, a second component of the determination of whether an email address is potentially deceptive relies on the context in which this is used. This is another example of a non-monotonic filter function. In some embodiments, if an email address of the sender of an email corresponding to a non-trusted party is similar to that of a trusted party associated with the recipient of the email, then that is deceptive, as the sender may attempt to mimic a trusted party. On the other hand, if the sender of an email is trusted, then having a reply-to address that is similar to the sender email address is deceptive. For example, a scammer can gain access to an account and send emails to friends of the account owner but modifies the reply-to email to a similarly looking address so that the real account holder does not see responses. Therefore, based on the trust relationship, the notion of "deceptive" changes meaning.

Another example of a non-monotonic aspect of the techniques disclosed herein is the presence of a reply-to address. In some embodiments, it matters less whether a non-trusted sender has a reply-to address, and this should not affect the filtering decision; on the other hand, it does matter whether a trusted sender has a reply-to address. If this reply-to address is deceptive with respect to the sender address, that is treated as a reason for taking a filtering action. In one embodiment, the fact that an email has a reply-to address—independently of whether it is deceptive—where the reply-to address is not previously associated with the sender, is sufficient to flag the email if the sender is a trusted party. In various embodiments, flagged emails can be blocked, quarantined, marked up, or otherwise processed to reduce the risk associated with them. The same is not true for a sender who is not a trusted party.

In one embodiment, the available filtering decisions are conditional for at least some of the detection components. For example, if it is determined that an email is sent from a non-trusted party, then it is acceptable to block it if it contains some elements associated with high risk. If the apparent sender of the email is a trusted party and the email headers contain a deceptive reply-to address, then it is also acceptable to block the message. If the apparent sender of the email is a trusted party and there is a new reply-to address that is not deceptive, then it is not acceptable to block the email, but more appropriate to quarantine, mark up, or otherwise flag the email. Similarly, if the apparent sender of the email is a trusted party and there is no reply-to address but content associated with risk, then based on the level of risk, the message may either be marked up or tagged, or simply let through, if the risk is not very high. Instead of blocking emails that are evaluated to be high-risk from a scam perspective as well as possibly having been sent by a trusted party, the emails can be marked up with a warning, sent along with a notification or warning, quarantined until a step-up action has been performed, or any combination of these or related actions. One example step-up action involves the filtering system or an associated system automatically sending a notification to the apparent sender, asking for a confirmation that the message was indeed sent by this party. In some embodiments, if a secondary communication channel has been established between the filtering system and the apparent sender, then this is used. For example, if the filtering system has access to a cell phone number associated with the sender, then an SMS or an automated phone call may be generated, informing the sender that if he or she just sent an email to the recipient, then he/she needs to confirm by responding to the SMS or phone call, or performing another confirming action, such as visiting a website with a URL included in the SMS. In some embodiments, the received email is identified to the recipient of the SMS/phone call, e.g., by inclusion of at least a portion of the subject line or greeting. If no secondary communication channel has been established, then in some embodiments, the system sends a notification to the sender requesting this to be set up, e.g., by registering a phone number at which SMSes can be received, and have this validated by receiving a message with a confirmation code to be entered as part of the setup. In some embodiments, to avoid spoofing of the system, the request is made in the context of an email recently sent by the party requested to register. For example, the registration request may quote the recently sent email, e.g., by referring to the subject line and the recipient, and then ask the sender to click on a link to register. Optionally, this setup can be initiated not only for high-risk messages, but also as a user is qualified as trusted (e.g., having been detected to be a friend), which allows the system to have access to a secondary communication channel later on. Phone numbers can also be obtained by the filtering system accessing address books of users who are protected by the system, extracting phone numbers from emails that are being processed, and associating these with senders, or other techniques. Other secondary channels are also possible to use, such as alternative email addresses, Skype messaging channels, Google Chat messages, etc. In an alternative embodiment, it is possible to transmit an email message to the sender of the high-risk message in response to the processing of the high-risk message, requiring the sender of the high-risk message to confirm that this was sent by him or her by performing an action such as responding to an identification challenge, whether interacting with an automated system or an operator. This can be done on the same channel as used by the sender of the message, or to another email address, if known by the system. Any identification challenge system can be used, as appropriate. This can be combined with the setup of a secondary channel, as the latter provides a more convenient method to confirm the transmission of messages.

In some embodiments, the technique for quarantining high-risk messages sent by trusted parties until a secondary channel confirmation has been received seamlessly integrates second factor authentication methods with delivery of sensitive emails, such as emails containing invoices or financial transfer requests. This can be beneficial in systems that do not focus on blocking of high-risk messages as well as in systems such as that described in the exemplary embodiment below.

In some embodiments, configured to protect consumers, content analysis would not focus on mention of the word "invoice" and similar terms of high risk to enterprises, but instead use terms of relevance to consumer fraud. For example, detection of likely matches to stranded traveler scams and similar can be done using a collection of terms or using traditional machine learning methods, such as Support Vector Networks (SVNs). In some embodiments, if a likely match is detected, this would invoke a second-factor authentication of the message.

The use of second factor authentication (2FA) for confirmation is beneficial to avoid risk. For example, if Alice sends an email to her broker, Bob, asking Bob to sell some of her stock, then it is beneficial for Bob to confirm with Alice before performing the sale. This avoids performing transactions as a result of attacks, such as a spoofing attack in which Eve is sending a spoofed message to Bob, appearing to come from Alice. It also mitigates the threat associated with malware and stolen computers. For example, consider a setting where Eve places malware on Alice's computer, causing an email to be sent from Alice to Bob, in which Bob is asked to sell some of Alice's stock. In these examples, using a 2FA for confirmation reduces the threat, as if Eve does not have the ability to receive the 2FA request and respond to it on Alice's behalf, then the email request will be ignored by Bob. The 2FA confirmation requests can include SMS messages or (manually or automatically placed) phone calls. Existing systems for sending 2FA confirmation requests are not automated. Instead, for example, Bob reads his email from Alice, and determines in a case-by-case basis whether to initiate a 2FA confirmation request. Sometimes, Bob may make a mistake or be hurried by a high-priority request, thereby deciding to ignore the 2FA confirmation. Scammers may trick Bob to omit the request. In some embodiments, the techniques described herein include automating the determination of when to send a 2FA confirmation request, and integrates the confirmation with the delivery of the email. This way, Bob will not receive the email from Alice until Alice has confirmed it, unless it is an email that does not require a confirmation, in which case it will be delivered immediately.

In some embodiments, the techniques described herein are usable to automate the use of 2FA for confirmation of emails associated with heightened risk. In some embodiments, this is a three-stage process, an example of which is provided below.

In the first stage, channel information is obtained. In some embodiments, this channel information is a phone number of a party, where this phone number can be used for a 2FA confirmation. For example, if the phone number is associated with a cell phone, then an SMS can later be sent for 2FA, as the need arises to verify that an email was sent by the user, as opposed to spoofed or sent by an attacker from the user's account. Whether it is a cell phone number or landline number, the number can be used for placing of an automated phone call. The channel can also be associated with other messaging methods, such as IM or an alternative email address. In one embodiment, the first stage is performed by access of records in a contact list, whether uploaded by a user of a protected system, by an admin associated with the protected system, or automatically obtained by the security system by finding the contact list on a computer storage associated with the protected system. Thus, in this embodiment, the setup associated with the first stage is performed by what will later correspond to the recipient of an email, where the recipient is a user in the protected organization. In another embodiment, the first stage is performed by the sender of emails, i.e., the party who will receive the 2FA confirmation request as a result of sending a high-risk email to a user of the protected system. In one embodiment, sender-central setup of the 2FA channel is performed after the sender has been identified as a trusted party relative to one or more recipients associated with the protected system, and in some embodiments, is verified before being associated with the sender. This verification can be performed using standard methods, in which a code is sent, for example, by SMS or using an automated phone call, to a phone number that has been added for a sender account, and after the associated user has received the code and entered it correctly for the system to verify it, then the number is associated with the sender. If a sender already has a channel associated with his or her email address, for example, by the first stage of the process having been performed in the past, relative to another recipient, then in some embodiments, it is not required to perform the setup again. If later on, a 2FA confirmation request fails to be delivered, then, in some embodiments, the channel information is removed and new channel information requested. Channel information can be validated by sending a link to an email account associated with a sender, containing a link, and sending a message with a code to the new channel, where the code needs to be entered in a webpage associated with the link in the email. In one embodiment, this is performed at a time that there is no suspicion of the email account being taken over. Alternatively, the validation can be performed by the recipient entering or uploading channel data associated with a sender. While the validation of the channel may not be completely full-proof, and there is a relatively small potential risk that an attacker would manage to register and validate a channel used for 2FA, the typical case would work simply by virtue of most people not suffering account take-overs most of the time, and therefore, this provides security for the common case.

An alternative approach to register a channel is to notify the user needing to register that he or she should call a number associated with the registration, which, in some embodiments, includes a toll-free number, and then enter a code that is contained in the notification. For example, the message could be "Your email to Alice@company.com with subject line 'March invoice' was quarantined. To release your email from quarantine and have it delivered, please call <number here> and enter the code 779823 when prompted." In some embodiments, at any time, one code is given out to one user. When a code is entered, the phone number of the caller is obtained and stored. An alternative approach is to request an SMS. For example, the message could be "Your email to Alice@company.com with subject line 'March invoice' was quarantined. To release your email from quarantine and have it delivered, please SMS the code 779823 to short code <SMS number here>."

In some embodiments, if the phone number has previously been used to register more than a threshold number of channels, such as more than 10 channels, then a first exception is raised. If the phone number is associated with fraud, then a second exception is raised. If the phone number is associated with a VoIP service, then a third exception is raised. If the phone number is associated with a geographic region inconsistent with the likely area of the user, then a fourth exception is raised. Based on the exceptions raised, a first risk score is computed. In addition, in some embodiments, a second risk score is computed based on the service provider, the area code of the phone number, the time zone associated with the area code, the time of the call, and additional aspects of the phone number and the call. In some embodiments, the first and the second risk scores are combined, and the resulting value compared to a threshold, such as 75. In some embodiments, if the resulting value exceeds the threshold, the risk is considered too high, otherwise it is considered acceptable. If the risk is determined to be acceptable, then in some embodiments, the phone number is recorded as a valid channel. If later it is determined that a valid channel resulted in the delivery of undesirable email messages, then in some embodiments, the associated channel data is removed or invalidated, and is placed on a list of channel data that is associated with fraud.

In the second stage, a high-risk email is sent to a user of a protected organization, from a sender that the system determines is trusted to the recipient. In one embodiment, the email is placed in quarantine and a 2FA confirmation request to the email sender is automatically initiated by the security system, where the sender is the party indicated, for example, in the 'from' field of the email. In some embodiments, this 2FA confirmation is sent to the channel registered in the first stage. In one embodiment, if this transmission fails, then a registration request is sent to the email address of the sender of the email, requesting that the sender registers (as described in the first stage, above.

In a third stage, a valid confirmation to the 2FA confirmation request is received by the system and the quarantined message is removed from quarantine and delivered to the intended recipient(s). In the case where a registration request was sent in the second stage, in some embodiments, a different action is taken, to take into account that the new registration information may be entered by a criminal. An example action is to remove the quarantined message from quarantine, mark it up with a warning, the entered channel information, and a suggestion that the recipient manually verifies this channel information before acting on the email. The marked-up email can also contain a link for the recipient to confirm that the entered channel information is acceptable, or to indicate that it is not. If the system receives a confirmation from the recipient that the entered channel information is acceptable then this information is added to a record associated with the sender. The email is then transmitted to the intended recipient(s).

An alternative authentication option is to request the sender authenticate through a web page. A request with a URL link can be sent on a variety of channels including the original sending email address, an alternate email address, or an SMS containing a URL. The appropriate channel can be selected based on the likelihood of risk. A long random custom URL can be generated each time to minimize the likelihood of guessing by an attacker. The user can click on the link and be transparently verified by the device information including browser cookies, flash cookies, browser version information or IP address. This information can be analyzed together to confirm that it is likely a previously known device. For example, if there is no prior cookie and the IP address is from another country, then this is unlikely to be the correct user. A second factor, in addition to device information, can be the entry of a previously established passcode for the user. The second factor can be a stronger factor including a biometric, or token that generates unique time based values. FIDO (Fast Identity Online) authentication tokens can be used to provide strong factor with a good user experience.

One authentication option is to reply with an email and ask the receiver to call a number to authenticate. This is an easy way to capture new phone numbers for accounts. Because the incoming phone number can be easily spoofed, a follow up call or SMS back to the same number can complete the authentication. In one scenario, the user can be asked what follow up they would like. For example, "Press 1 to receive an SMS, Press 2 to receive a phone call."

Authentication using a previously unknown phone number can also be performed. For example, authentication can be strengthened by performing various phone number checks including a Name-Address-Phone (NAP) check with a vendor or a check against numbers previously used for scams or a check against a list of free VOIP numbers.

Yet another example technique for 2FA involves hardware tokens displaying a temporary pass code. In some embodiments, the system detects a high-risk situation as described above and sends the apparent sender an email with a link, requesting that the apparent sender clicks on the link to visit a webpage and enter the code from the 2FA token there. After this code has been verified, in some embodiments, the high-risk email is removed from quarantine and delivered to the recipient. In this context, a second channel is not needed, as the use of the token makes abuse by a phisher or other scammer not possible.

Other conditional verification techniques can be conditionally used for high-risk situations involving emails coming from trusted accounts. One of the benefits of the techniques described herein is to selectively identify such contexts and automatically initiate a verification, while avoiding to initiate a verification for other contexts.

In one embodiment, the conditional verification is replaced by a manual review by an expert trained in detecting scams. In some embodiments, the email under consideration is processed to hide potential personally identifiable information (PII) before it is sent for the expert to review. In some embodiments, at the same time, the email is placed in quarantine, from which it is removed after the expert review concludes. If the expert review indicates that the email is safe then, in some embodiments, it is delivered to its intended recipients, whereas if the expert review indicates that it is not desirable, then it is discarded.

When the terms "blocked" and "discarded" are used herein, they are interchangeably used to mean "not delivered", and in some embodiments, not bounced to the sender. In some instances, a notification may be sent to the sender, explaining that the email was not delivered. The choice of when to do this is, in some embodiments, guided by a policy operating on the identified type of threat and the risk score of the email.

The benefits of the technology can be understood by looking at how different attacks are addressed, and the extent to which they—should they not be addressed—appear as desirable traffic. Examples of the main types of attack include: spoofed emails, account take-overs, deceptive domains or email addresses, high-risk content, and other. Examples of the main types of desirable email include email from trusted parties (whether what we refer to as 'friends' or 'internal' traffic), and email from parties that are not trusted. The associated relationships are considered in detail below:

Spoofed adversarial traffic is potentially likely, based, for example, on observations of abuse attempts. In some embodiments, the disclosed system detects (virtually) all spoofed adversarial traffic, based, for example, on analysis of trust relationships and inclusion of reply-to addresses. False positives based on the analysis of trust relationships and reply-to addresses may be very unlikely, but possible. To mitigate the risk of false positives, in some embodiments, the system initiates a to-sender verification request, as described below. From a practical perspective, the disclosed approach can make the error rates associated with spoofed emails negligible.

Adversarial traffic relying on account take-overs is also potentially likely, based, for example, on observations of abuse attempts. Such traffic may resemble benevolent traffic closely, making it difficult to act on without causing errors. The techniques described herein address this by, for example, identifying high-risk messages based at least, among other things, on content, quarantining such high-risk messages, and conditionally releasing them from quarantine based either on a valid response to a second factor authentication of the message or on a request from the recipient to remove the message from quarantine. In some embodiments, this is only done for high-risk traffic, determined at least in part based on message content, and therefore, avoids unnecessary actions for senders and receivers of common low-risk traffic. Again, from a practical perspective, the approach described herein can make the error rates associated with emails arising from account takeovers negligible.

The most common type of adversarial traffic, based on observations of abuse attempts, corresponds to emails that are sent from domains or accounts created by the attacker, and where these use deceptive naming, whether of display names, user names, domain names, or a combination of these. Using the techniques described herein, such traffic can be made to stand out from benevolent traffic. In some embodiments, this type of traffic is detected by analyzing trust relationships and determining whether the sender names are deceptive. In some embodiments, this determination is based at least in part on information relating to who is a trusted party to the recipient, which in turn can be based on previously received and sent emails, but also based on what is referred to herein as "universal" trust relationships. An example of the latter is a trust relationship a user may have with a famous brand, such as a bank, based knowledge about the brand. For an email that is identified as coming from a source with a very high deceptive score, the email, in one embodiment, is blocked, whereas an email coming from a source with a deceptive score that is not very high but also not low can be marked up with a warning or quarantined. This selection can be based on a configuration made by the recipient or an admin associated with the recipient. The approach described herein makes the error rates associated with emails from deceptively named senders very low. Moreover, since benevolent traffic from such sources is typically rare, the risk of mis-classificaton is very low. In particular, false positives are unlikely to be associated with trusted senders, since a filtering action depends both on not coming from a trusted source and being sent from a deceptively named account.

Another example type of adversarial traffic is different from the three above-described types of adversarial traffic, and is from an account controlled by the attacker, where this account does not have a trusted status with respect to the recipient of the email, and is not a whitelisted brand, such as a bank or a company for which attackers cannot easily generate messages. This excludes what are referred to as promiscuous domains, which correspond to services where it is may be easy for an attacker to register an account. The sender, furthermore, is typically not deceptively named, but has high-risk content. Examples of such content include keywords and phrases indicative of common scams. The content portion can include text in the email, text in attachments, and names of attachments. In some embodiments, it also includes text associated with webpages hyperlinked from the content portion, the associated URLs, and the functionality of the webpages. One type of functionality is at least one text entry field for which entered text is not represented as the text itself, but as other characters, such as stars. This can be common for password entry. In some embodiments, when the system identifies an email that satisfies these criteria, it blocks the email if the content risk is determined to be very high. In one embodiment, it marks up emails that are determined not to be very high risk, but also not low risk, or alternatively, places such emails in quarantine. The decision of what action to take on such messages can either be a user configuration selection, an admin configuration selection, or a selection made as part of the system design. The error rates associated with message classifications of this type are typically low. This is because messages from strangers, where these messages contain high-risk content, are typically dangerous. In some embodiments, messages from trusted parties are not considered in this category.

Yet another type of email is not from a trusted party, and does not contain high-risk content. In some embodiments, such emails are delivered in the recipient's inbox. In one embodiment, all emails from parties who are not trusted are marked up with a notification, such as "This email comes from a party with whom you do not have a trust relationship." In another embodiment, such a warning is only added to messages whose risk exceeds a minimum value (e.g., by coming from a newly registered domain or having at least one word associated with risk in the content portion). Messages of this type are typically of low actual risk, and therefore, are safe to deliver to the recipient. There is no risk associated with false positives, as no messages of this type are blocked.

In some embodiments, if a message is determined to have a high risk of being the result of a spoofing attack, a message of a first type of message is transmitted to an address associated with the sender, whereas if a message is determined to have a high risk of being the result of an account take-over, then in some embodiments, a second type of message is transmitted to an address associated with the sender. In some embodiments, the classification of the problem is used in the selection of the messaging method. In the first case, when there are indications that the email is the result of a spoofing attack, then, in one embodiment, a message is sent to the apparent sender of the email (but not to the reply-to address, if such an address is present). The message can state, for example, "Your message with subject <subject line here>, which you sent to <recipient list here> has been quarantined. In order to cause it to be delivered, please click here <hyperlink inserted here> or respond "ok" to this notification to confirm. By clicking or responding, your email will be delivered. If you did not send the email, you do not have to do anything." Note that if the message was spoofed, which means that it was sent by a party other than the claimed sender, then the apparent sender will not respond to the request, and therefore, the email associated with high risk would not be delivered.

In contrast, when an email is determined to have a high risk of being associated with an account take-over, then in some embodiments, a 2FA confirmation request is initiated. This can include a message sent to an address other than the apparent sender, and may be a secondary email address, a phone number or an instant messaging address. The content of the notification message may be similar to what was described in the context of suspected spoof messages. If no valid channel address has been registered, in some embodiments, the recipient receives a message describing that the email has been placed in quarantine, but no message would be sent to an account associated with the apparent sender.

In some embodiments, if an email is placed in quarantine and not moved from there by an action of a sender or the recipient, then after a threshold duration has passed, it is be erased. This threshold can for example be one week, one month, forever, or any other appropriate threshold time period.

In cases where it is determined that an email is either at high risk for being associated with spoofing or with an account take-over, but it cannot be determined whether it is one or the other, then one example response is to verify whether the apparent sender is associated with a valid channel, and if so, send a message over that channel; and otherwise, to send a message to the apparent sender. In some embodiments, in the second case, this request also involves the registration and validation of a channel. If a message can be determined to almost certainly be the result of spoofing, for example, by analyzing the route and finding anomalies indicative of spoofing, then no request is sent, but the message is simply blocked. Similarly, if a message can be determined to almost certainly be the result of account take-over, such as exhibiting an anomalous volume of high-risk messages being sent from it, then no request is sent, but the message is simply blocked.

FIG. 1 is a block diagram illustrating an embodiment of a system for detecting scam. In the example shown, system 100 may be used to detect scam such as business email compromise. As shown in this example, system 100 includes interface 102, risk classification engine 104, quarantine engine 106, confirmation engine 108, risk data collection engine 110, risk data assessment engine 112, and database 114.

In this example, a message such as an email is received over a network (such as the Internet) via interface 102. The email message is passed to risk classification engine 104, which is configured to determine a risk associated with the email message. In some embodiments, the risk is determined using the detectors and components described above. In some embodiments, classifying/assessing the risk associated with the email message includes evaluating header and/or content portions of the email message to determine whether the email message is indicative of malicious intent, such as spoofing, account takeover, or some other type of scam. In some embodiments, as described above, the risk assessment/classification is based on determining whether the email message is associated with a deceptive sender. The classification/assessment may also be performed based on trust-based filtering, as described above.

Based on the risk assessment, the message may be passed to quarantine engine 106. For example, if the risk determined for the message exceeds a threshold, then the message is placed in quarantine, and is prevented (e.g., at least temporarily) from being delivered.

Confirmation engine 108 is configured to request confirmation that the sender of the message did indeed originate the email message. In some embodiments, confirmation is obtained using second factor authentication (2FA). The manner in which the confirmation is sent may be determined based on contact information associated with the email address of the sender. For example, as described above, if a cellular phone number was previously associated with the email address, in some embodiments, 2FA based on a text message (e.g., short message service (SMS) message) is performed. In other embodiments, as described above, email based 2FA may be performed (e.g., because SMS is not possible due to there not being an associated phone number).

In some embodiments, enrollment/registration may be performed as well, as described above.

Risk data associated with the performing of the 2FA is collected by risk data collection engine 110. The collected data is then assessed using risk data assessment engine 112 and in some embodiments, stored to database 114. Based on the risk assessment using the collected data associated with the confirmation, a determination is made whether or not to deliver the email message to the recipient.

In some embodiments, the scam detection system described herein comprises standard commercially available server hardware (e.g., a multi-core processor, 4+ Gigabytes of RAM, and one or more Gigabit network interface adapters) and runs typical server-class operating systems (e.g., Linux), as well as Java HTTP server software stack. The scam detection system can be implemented using a scalable, elastic architecture and may comprise several distributed components, including components provided by one or more third parties. Further, when the scam detection system is referred to herein as performing a task, such as storing data or processing data, it is to be understood that a sub-component or multiple sub-components of the scam detection system (whether individually or in cooperation with third party components) may cooperate to perform that task.

Figure 2A:
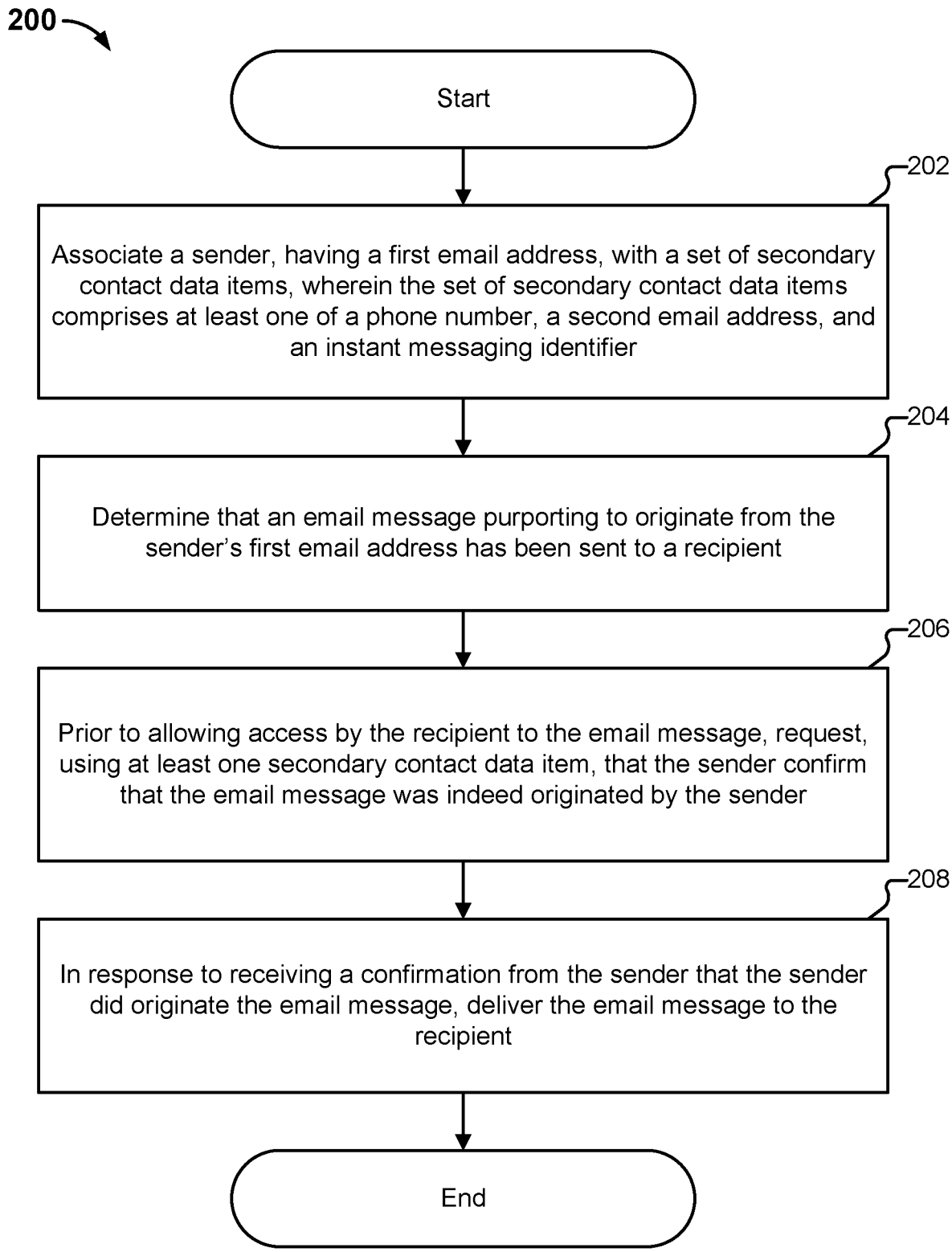
FIG. 2A is a flow diagram illustrating an embodiment of a process for detecting scam.

FIG. 2A is a flow diagram illustrating an embodiment of a process for detecting scam. In some embodiments, process 200 is executed by system 100 of FIG. 1. The process begins at 202 when a sender, having a first email address, is associated with a set of secondary contact data items. Examples of secondary contact data items include a (cellular) phone number, a second email address, an instant messaging identifier, or any other appropriate contact data item.

At 204, it is determined that an email message purporting to originate from the sender's first email address has been sent to a recipient. In some embodiments, a risk is determined to be associated with the email message, for example, using the message risk evaluation and classification described above. At 206, prior to allowing access by the recipient to the email message, it is requested, using at least one secondary contact item in the set of secondary contact data items, that the sender confirm that the email message was indeed originated by the sender. For example second factor authentication is performed to verify or confirm that the sender did originate the email message. In some embodiments, the at least one secondary contact item is associated with a secondary communication channel. For example, the request may be made using SMS and/or email. At 208, in response to receiving a confirmation from the sender that the sender did originate the email message, the email message is delivered to the recipient.

Figure 2B:
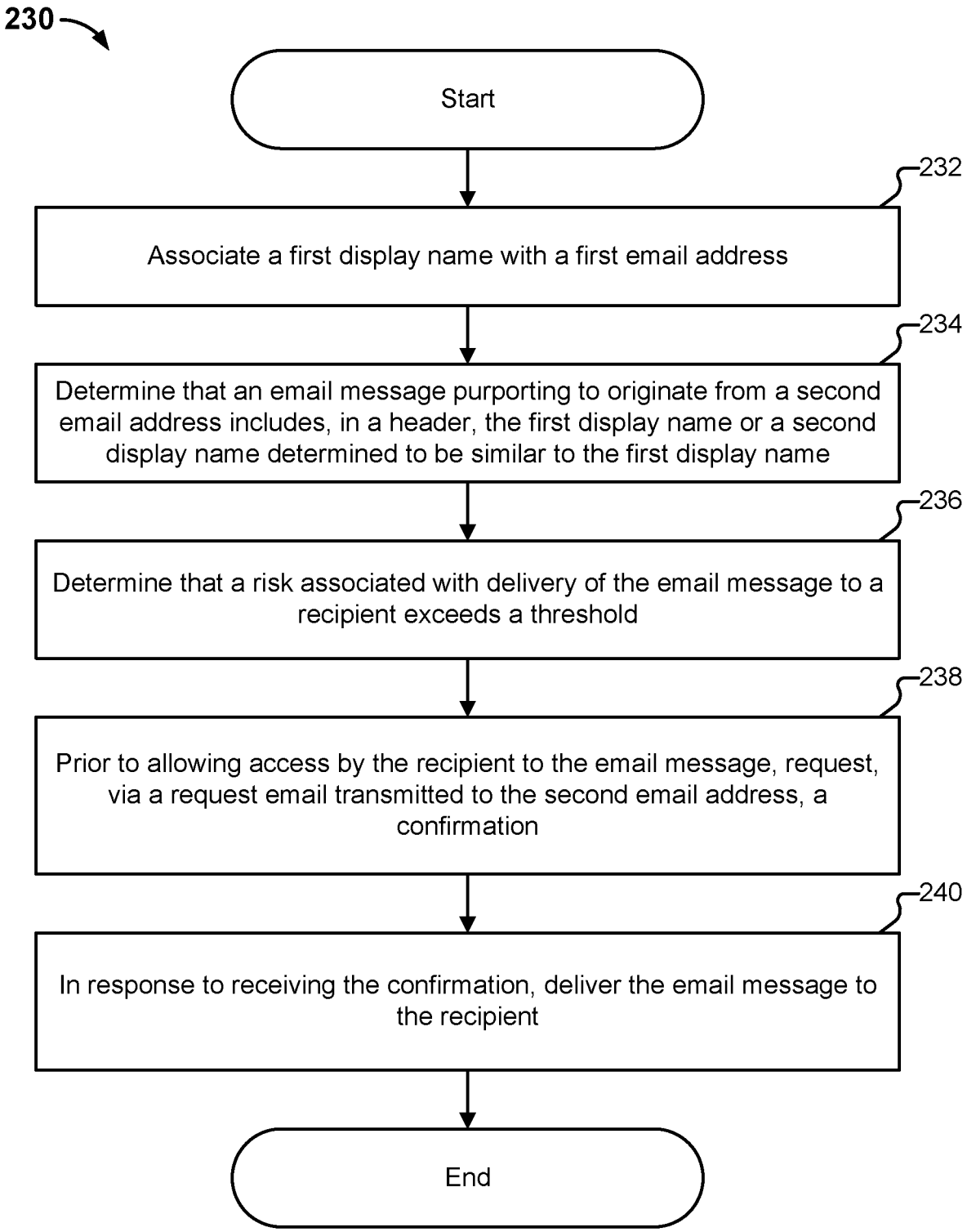
FIG. 2B is a flow diagram illustrating an embodiment of a process for detecting scam.

FIG. 2B is a flow diagram illustrating an embodiment of a process for detecting scam. In some embodiments, process 230 is executed by system 100 of FIG. 1. The process begins at 232 when a first display name is associated with a first email address. At 234, it is determined that an email message purporting to originate from a second email address includes, in a header, the first display name or a second display name determined to be similar to the first display name. At 236, it is determined that a risk associated with delivery of the email message to a recipient exceeds a threshold. At 238, prior to allowing access by the recipient to the email message, a confirmation is requested via a request email transmitted to the second email address. At 240, in response to receiving the confirmation, the email message is delivered to the recipient.

Figure 2C:
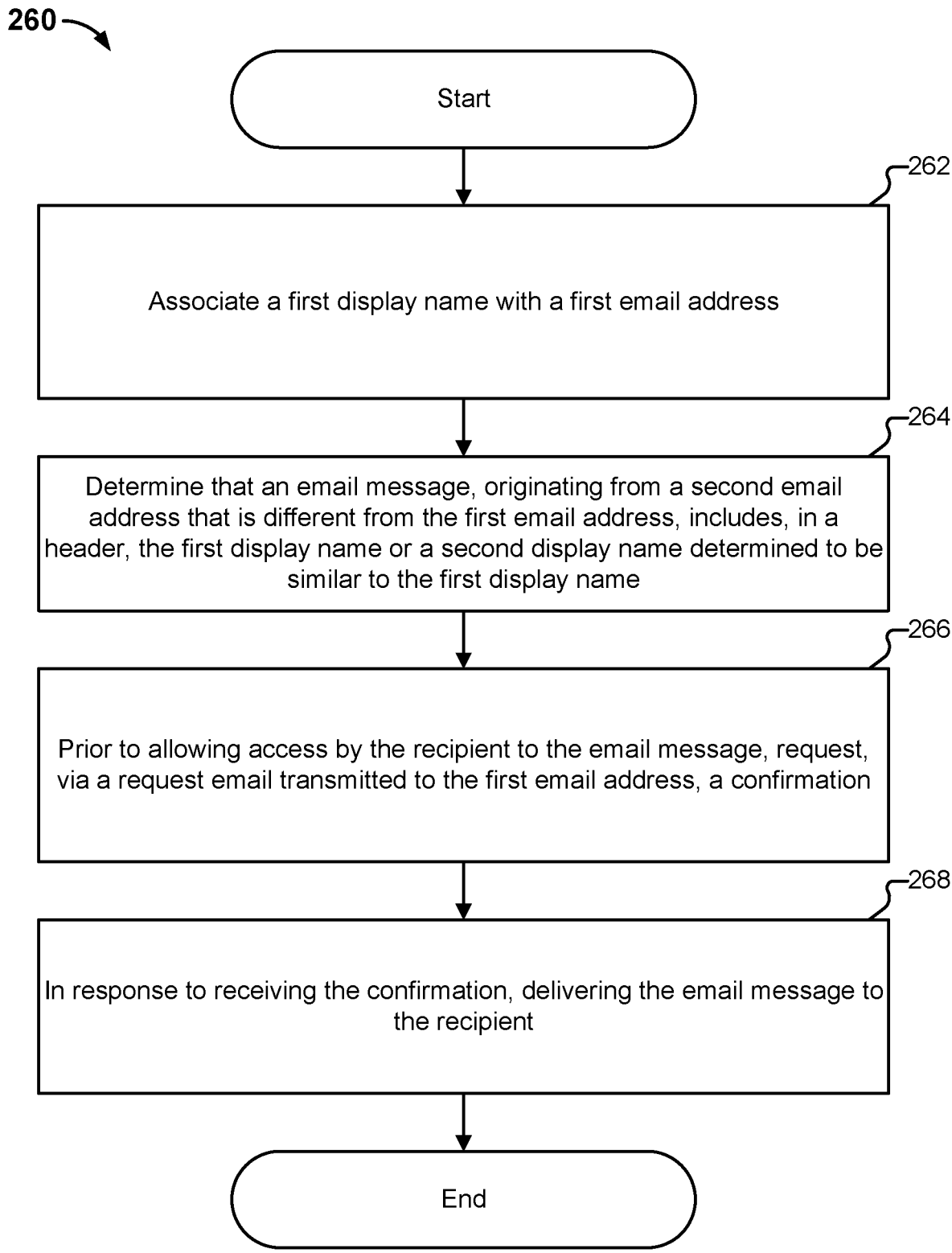
FIG. 2C is a flow diagram illustrating an embodiment of a process for detecting scam.

FIG. 2C is a flow diagram illustrating an embodiment of a process for detecting scam. In some embodiments, process 260 is executed by system 100 of FIG. 1. At 262, a first display name is associated with a first email address. At 264 it is determined that an email message, originating from a second email address that is different from the first email address, includes, in a header, the first display name or a second display name determined to be similar to the first display name. At 266, prior to allowing access by the recipient to the email message, a confirmation is requested via a request email transmitted to the first email address. At 268, in response to receiving the confirmation, the email message is delivered to the recipient.

Figure 2D:
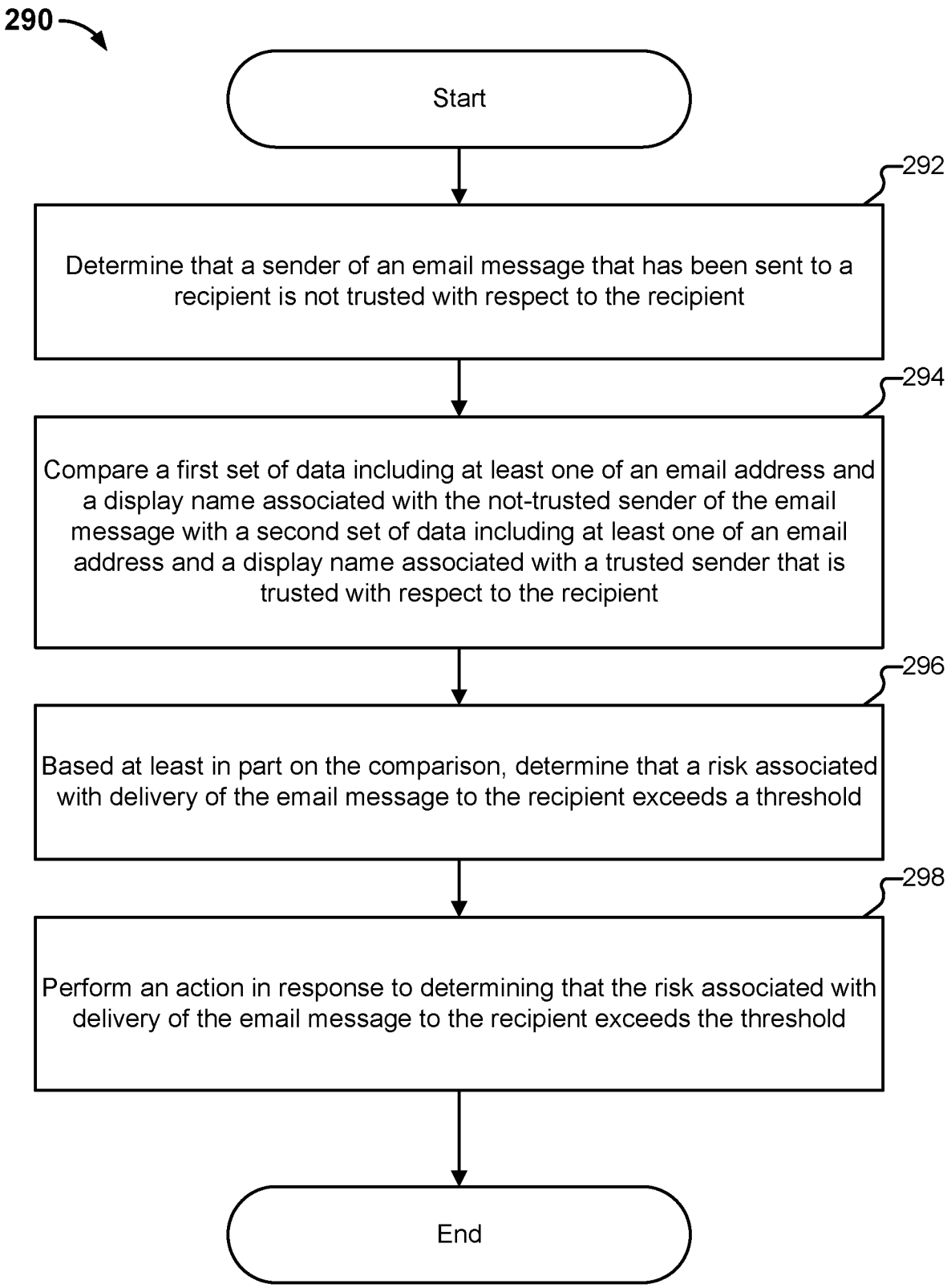
FIG. 2D is a flow diagram illustrating an embodiment of a process for detecting scam.

FIG. 2D is a flow diagram illustrating an embodiment of a process for detecting scam. In some embodiments, process 290 is executed by system 100 of FIG. 1. At 292, it is determined that a sender of an email message that has been sent to a recipient is not trusted with respect to the recipient.

At 294, a first set of data including at least one of an email address and a display name associated with the not-trusted sender of the email message is compared with a second set of data including at least one of an email address and a display name associated with a trusted sender that is trusted with respect to the recipient. In various embodiments, the trusted sender includes at least one of a friend, an internal party, a party included in an entry in an address book associated with the recipient, a party connected to the recipient on a network, and a party that has previously communicated with the recipient via a messaging application. In some embodiments, comparing the first and second sets of data is performed with respect to at least one of display name, user name, domain name, and top level domain (TLD).

At 296, based at least in part on the comparison, it is determined that a risk associated with delivery of the email message to the recipient exceeds a threshold. At 298, an action is performed in response to determining that the risk associated with delivery of the email message to the recipient exceeds the threshold. Examples of such actions include quarantining the email message, including a portion of the email message in a request, modifying the email message, and marking the email message with a warning.

The following are additional example embodiments of the scam detection techniques described herein:

In some embodiments, detecting scam email includes the use of at least two deception detection components and a combining logic component configured to match outputs of the at least two deception detection mechanisms with at least one scammer strategy. In some embodiments, when an input email is evaluated, a filtering decision is generated based on the output of the combining logic component. In some embodiments, at least one deception detection component uses data relating to email addresses in the headers of the input email, and at least one deception detection component may use data associated with the recipient of the input email.

In another example embodiment, detecting scam email includes the use of at least two deception detection components and a combining logic component that is non-monotonically increasing. In some embodiments, an email classification decision is generated by evaluating the at least two deception detection components on the email, and combining the outputs of the at least two deception detection components using the combining logic component.

In some embodiments, determining trust includes the use of a traffic scan unit and a classification unit. In some embodiments, the traffic scan unit is configured to scan email traffic and determine, based on stored criteria and the scanned traffic, that a first sender qualifies as trusted to a first receiver. In some embodiments, after this has been determined, the traffic scan unit is further configured to generate and store an approval, where the approval includes information about the first sender and a time stamp. In some embodiments, the classification unit is configured to read the approval and determine whether a pre-configured amount of time has elapsed since the approval was generated. In some embodiments, a classification is conditionally generated when this is determined to have taken place, where the classification indicates that the first sender is trusted (e.g., to the first receiver or users associated with the first receiver).

In some embodiments, a trusted sender is enrolled in a secondary communication channel. Enrolling the trusted sender in a secondary communication channel may include identifying a high-risk message from the trusted sender, placing the high-risk message in quarantine and generating a request on the secondary communication channel, followed by delivering the high-risk message to its recipients conditional on the response to the request.

In some embodiments, high-risk messages sent from trusted senders are quarantined. Quarantining high-risk messages sent from trusted senders may include sending a 2FA confirmation request to a validated channel associated with the sender, where the email is moved from the quarantine to the inbox of the recipient conditional on a valid response to the request.

In some embodiments, a message is classified as being associated with at least one of a high risk of spoofing, a high risk of account take-over, a high risk of deceptive name usage, and a high risk based on content. An action may be performed, where the action associated with the message classified as being associated with a high risk of spoofing may be a first type of request automatically sent to the address of the sender of the message, and where the action associated with the message classified as being associated with a high risk of account take-over is a second type of request automatically sent to an address associated with the sender of the message, but distinct from the address of the sender of the message. In some embodiments, the message is delivered to the recipient conditional on receiving a valid response to the request.

Exemplary Embodiment

In the following, the techniques described herein are described using example pseudocode associated with an example implementation. The example embodiment is provided for illustrative purposes, and alternative embodiments are possible.

The following embodiment uses a data structure such as the following:

Example Data Structure:

In this example, each email E is represented by the following components

| | |
|---|---|
| E.from | : account (see below for a description) |
| E.sender | : account |
| E.replyto | : account |
| E.to | : account |

```
E.content       : a pointer to a string storage area
E.attachments   : a pointer to a linked list of pointers to attachments
```

In turn, an account A is represented in the following way:

```
    A.displayname    % This corresponds to the underlined part in an
email account
                     % "Joe Schmoe" <JoeS@hiscompany.com>
    A.username       % "Joe Schmoe" <JoeS@hiscompany.com>
    A.domainhead     % "Joe Schmoe" <JoeS@hiscompany.com>
    A.TLD            % "Joe Schmoe" <JoeS@hiscompany.com>
```

% From those, one can construct the following useful combinations:
% address:=A.username+"@"+A.domainhead+"."+A.TLD
% domain:=A.domainhead+"."+A.TLD
% addresshead:=A.username+"@"+A.domainhead
% account:=A.displayname+' '+A.username+"@"+A.domainhead+"."+A.TLD Furthermore, in this example, a user or a set of users is associated with a contact list C, comprising entries Ci. The entries Ci can be represented in the following way:

```
    Ci.A                  : account
    Ci.NumberReceiptsFrom : a counter
    Ci.NumberEmailsTo     : a counter
    Ci.DateQualified      : a time stamp
    Ci.friend             : a boolean
    Ci.RecordedReplyto    : a list of reply-to addresses that have been
used by Ci.A
```

The above are example data structure components, provided for illustrative purposes.

Example Deception Detectors:

The following description details an example set of deception detectors, each one of which is associated with the detection of scams, and BEC scams in particular:

HasReplyTo

```
    input: an email E
    output: a boolean
    process:
           return (E.ReplyTo != empty field) and
           ((E.ReplyTo).address != (E.from).address)
    why: for many BEC scams, the use of reply-to is central
```

HowManyRecipients

```
    input: an email E, protected recipient email account A
    output: an integer value
    process: returns how many people in to/cc fields are protected
    accounts a global variable: the protected domain D
    detailed process:
    Create an empty set S.
    For all the recipients R in the to-field and all the recipients in the
    cc-field:
           If (R.domain != D) and (R != A) then
                S := S + R
    Return(length(S)) % that is, how many elements are in S
    why: for most BEC scams, there is exactly one email recipient in the
enterprise -- the scammer does not want to encourage discussion!
```

In one embodiment, accounts with the vacation auto-reply set are not counted, but otherwise, the same process as described above is performed. Similarly, in some embodiments, unattended email address are not counted; these are email addresses that cause automated responses, or where a human user is rarely reviewing the incoming traffic, or only with a substantial delay, such as several weeks. In some embodiments, facts like these are automatically inferred by the system by observing incoming and outgoing email traffic.

DeceptiveCompare

```
    input: an account A1, an account A2
    output: an integer value (0-100)
    process: return how deceptive an account is relative to another. Note
that if the corresponding addresses are identical, that is not deceptive at
all.
    detailed process:
    % The algorithm compares:
    %           two input accounts
    %           two input addressheads
    %           two input addresses
    %
    % In an alternative embodiment, the following are also
    compared:
    %           two input domains
    %           two input domainheads
    %           two input persons
    If A1.address=A2.address then
            Return(0) % They are not deceptive if
the email addresses are identical
    else
    Return(trunc(100*max(   JW(A1.account, A2.account),
                JW(A1.addresshead, A2.addresshead),
                JW(A1.address, A2.address))))
```

HowDeceptiveIsSender

```
    input: an email E, contact list C
    output: an integer value (0-100)
    process: returns how deceptive a sender is, relative to recipients
    contacts
    In some embodiments, senders are deceptive if they are similar to
contacts. (In contrast to reply-to addresses, which are deceptive if
they are similar to the from field.)
    process detail:
    MaxDeceptive:=0
    For all entries Ci of C:
            MaxDeceptive:=Max(MaxDeceptive,
DeceptiveCompare(E.from, Ci.A))
            Return(MaxDeceptive)
    why: Many BEC attacks involve the use of sending accounts that
make the recipient believe that they know the sender.
```

HowDeceptiveIsReplyTo

```
    input: an email E
    output: an integer value (0-100)
    process: returns how deceptive a reply-to address is, relative to
from field & sender field
    Reply-to addresses are deceptive if they are similar to (but not
the same as) the from field. (In contrast to senders, which are deceptive
if they are similar to a contact.)
    process detail:
    Return(DeceptiveCompare(E.replyto, E.from))
    why: Some BEC scams (e.g., those involving spoofing or
account-takeover (ATO)) come from "trusted" accounts; most other scams
typically come from people with limited interaction history. Taking this
structural approach into consideration -- along with other features that
characterize the cases -- allows for the identification of common cases
without high risks for misclassification.
```

IsFriend

```
input: an email E, contact list C
output: a boolean
process: return true if E is a friend of the party with contact list
C process detail:
    If there is a record Ci of C such that Ci.A=E.account then
        return(Ci_friend)
    else
        return(false)
why: Many BEC scams (such as those based of spoofing) need a
response to an address other than the apparent sending address -- but want
these to look similar.
```

UnFriend

```
input: an email address A, contact list C
output: N/A
process: remove an entry from the friend list and the
soon-to-be-friend list
    process detail:
        If there is a record Ci such that Ci.A=A then
            Ci_friend:=false           % not a friend (if he were)
            Ci.NumberReceiptsFrom:=0   % restart counters
            Ci.NumberEmailsTo:=0       % restart counters
            Ci.DateQualified:= nil     % set to
"not qualified"
        % Note that the record stays, but the "friend" designation is
set to false
``` why: When an obvious scammer is identified, this party should be unfriended. In such a scenario it is not necessarily the case that email will not be delivered—in some embodiments, that "nasty" email will more easily get trapped. If somebody who was ATOed were to be unfriended, and then had bad email sent from their account, there is potentially very limited damage: as soon as they recover their account, they will start communicating as usual, and soon enough, they will be back on the friend list.

IsInternal

```
input: an email address A, recipient domain D
output: a boolean
process: returns whether A is internal to the recipient
process detail:
    return(A.domain=D)
why: Some BEC scams (e.g., those involving spoofing or ATO) come
from "trusted" accounts; typically, most other scams come from people
with limited interaction history. Taking this structural approach into
consideration -- along with other features that characterize the cases --
allows for the identification of common cases without high risks for
misclassification.
```

IsChameleon

```
input: an email E
output: a boolean
process: returns whether A is chameleon
process detail:
If length(E.username)>ChameleonLengthThreshold then
else if (E.from in ChameleonList) then
    return(true)
else
    return(false)
```

Here, ChameleonLengthThreshold=30 is an example of a parameter choice.

In some embodiments, ChameleonList is a relatively short list of the most common senders of chameleon email, such as member@linkedin.com, *@yahoogroups.com, *@googlegroups.com, where * denotes a wildcard.

In one embodiment, the list ChameleonList is generated as follows:

1. A screening component observes reply-to addresses for all analyzed email. For each protected account, it records reply-to addresses used for all friends of the protected account. (where friends can include a trusted sender, as described above). In some embodiments, this is only done for emails that were considered safe.

2. If the number of observed reply-to addresses for one sender and one protected account exceeds a threshold (such as 10, which may be the size of the vector we use to store reply-to addresses for each sender account) then this sender is considered a chameleon reply-to sender. For example, a chameleon sender such as jobs@newopenings.com might have multiple reply addresses like reply1492A@newopenings.com . . . reply2201z.com to track their email responses. In some embodiments, a flag is set to identify this.

3. Periodically, and in some embodiments, in batch mode, a component scans the observed reply-to addresses for all protected accounts, and determines how many unique reply-to addresses there are for each unique sender. In some embodiments, if this exceeds a tunable threshold (say 100), then this sender is considered a chameleon reply-to sender. In some embodiments, a second flag is set to identify this. It can be a design option whether to have one flag per protected account (which may create challenges in updating) or one global record with a flag. This process can also be performed continuously, as a new incoming or outgoing email is processed.

why: Many legitimate merchants and newsletters use reply-to to track the efficacy of their emails. Many benevolent email senders use reply-to heavily. To save effort, storage, and to reduce error rates, it would be beneficial to avoid paying attention to these.

IsAssociatedReplyTo

```
input: a contact list C, an email E
output: a boolean
process: returns whether the reply-to of E has been used before
by the same sender
    also sets a global boolean variable to prompt conditional
addition to the RecordedReplyTo
    process detail:
    response = false
    For all Ci in C
        if (E.from = Ci.from) then
            if (Ci.friend) then
                if (E.replyto in Ci.RecordedReplyto) then
                    response=true
                else
                    AddToRecordedReplyTo := true
                    % and we can quit the loop "For all Ci in C" then
        return(response)
why: Some benevolent email senders may use reply-to, but most
(except chameleon senders) typically use the same reply-to (or a small
number of these) all the time. It would be beneficial to know if a reply-to
address that is seen is "new" - e.g., that signals risk.
```

NowRecordReplyTo

```
input: a contact list C, an email E
output: none; modifies contact list being input
process: the email is safe, the sender has a new reply-to -- record
it!
    process detail:
    Create a new Ci entry and add to C
    % ^ conditional on there being space, based on a limited number
of entries per record Ci
```

-continued

```
    % For example, this limited number may be 10.
    Ci.RecordedReplyto:=(E.replyto).address
    why: In some embodiments, this provides a maintenance routine for
"IsAssociatedReplyTo".
```

Promiscuous

```
    input: an email account A
    output: a boolean
    process: returns whether the address corresponds to a domain where
membership is not
        detailed process:
```

In some embodiments, a list of known promiscuous organizations is kept—Gmail, Yahoo, etc. This may comprise the 100 most commonly seen promiscuous organizations. In an alternative embodiment, a list of known non-promiscuous organizations that are found to otherwise cause misclassifications is also kept.

```
        If A in KnownPromiscuous then
            Promiscuous:= true
        else if A in KnownNonPromiscuous then
            Promiscuous := false
        else
            Promiscuous := Age(Domain(A)) < DomainAgeThreshold
            % Heuristic to mistrust new domains
            % Here DomainAgeThreshold may be 1 month
            % This is just an example heuristics.
    why: Some email accounts may be easy for criminals to create, others
may not.
Being able to determine what type of account is associated with an email
facilitates the determination of whether the email is high risk or not.
```

ReplyToDifferentDomain

```
    input: an email E
    output: a boolean
    process: returns whether the reply-to is from a different domain
than from/sender
        process detail:
            Return((E.replyto).domain != (E.from).domain)
    why: If the reply-to from an email sent by a user of a protected
enterprise goes to the same enterprise, that is lower risk than if the
reply-to goes to another domain.
```

PotentialPhishingURLs

```
    input: en email E
    output: a boolean
    process: returns whether the content portion contains a
likely password entry form
        process detail:
            response := false
            Scan E.content.
            For each hyperlink H of E.content:
                Visit the page H.
                If the visited site
                    a. contains at least two input fields
                    b. where one of them results in starred-out text
upon entry
                    then
                        response:=true
            Return(response)
    Note: In some embodiments, this is an alternative to
ProtectPhishingURLs. In some embodiments, not both are needed.
    why: Detecting attempts to phish users of protected enterprises can
be beneficial.
```

ProtectPhishingURLs

```
    input: an email E
    output: none, but the function rewrites E
    process: replaces all hyperlinks with "safe" alternatives
    Note: In some embodiments, this is an alternative to
PotentialPhishingURLs. In some embodiments, not both are needed.
        process detail:
            Scan E.content.
            For each hyperlink H of E.content:
                Replace H with a proxy hyperlink PH (described below).
```

In some embodiments, the proxy hyperlink is used to:

1. The proxy hyperlink is hosted by a security organization or the protected enterprise and encodes the "original" hyperlink.
2. When the proxy hyperlink is visited, it causes a wget, java httpget or a spider (that is dressed up as a browser, and which does not comply with robots.txt) to visit the original hyperlink site.
3. If the visited site:
   a. contains at least one input field
   b. where one input field results in starred-out text upon entry (in HTML this would be an form input field where the type attribute would be 'password')
   then
      display a warning message—unsafe site, potential phishing—with a link to proceed anyway—In some embodiments, this link leads to the original site
   else if the webpage contains content and/or logos for a known brand but the URL does not correlate with the brand
   then
      display a warning message—unsafe site, potential phishing—with a link to proceed anyway—this link leads to the original site
   else automatically redirect to the original site Alternate Embodiment 1. The proxy hyperlink is hosted by the scam detection system and encodes the "original" hyperlink.
2. Before a proxy hyperlink is visited, the suspect link can be analyzed before the click or at the click. This:
   a. allows the site to be checked in user time instead of in real-time in the emails stream
   b. performs the check when the user is about to access the site. Scammers can vary the content and the click time check is a better more timely content verification. If there is problem a warning message is displayed "This site may not be trusted. If you are asked to enter a password, be very careful. Click to proceed."
3. If there is no problem with the destination site, then in some embodiments, the system provides a silent redirect to the intended site when the user clicks.

Note: In some embodiments, this is an alternative to PotentialPhishingURLs. In some embodiments, not both are needed.

why: Detecting attempts to phish users of protected enterprises can be beneficial.

ResetVariables

```
process:
    HasReplyTo := false
    IsChameleon := false
    HowDeceptiveIsReplyTo:=0
    IsAssociatedReplyTo:=false
    Classification:=safe
    AddToRecordedReplyTo := true
why: In some embodiments, this is a maintenance routine for the combing
logic.
```

JW % this is an Example of an Improved Version of the Jaro-Winkler Algorithm
  inputs: two accounts
  process:
  Step 1: Normalization.
  In one embodiment, the following normalization methods are applied:
  1. Identify homograph attacks.
    If any sender has a display name, user name or domain name that includes unicode characters matching a list of known suspect characters intermixed with non-unicode characters, then an action is taken, where this action is at least one of flagging the email as high-risk, mapping the suspect characters to corresponding characters that look similar; and causing a risk score to be increased. For example, PayPal can be spelled using Cyrillic 'a' characters while the others could be Latin-1 characters.
  2. Identify different components and normalize.
    Typical display names consist of multiple "words" (i.e., names). These are separated by non-letters, such as commas, spaces, or other characters. These are normalized, e.g., by being sorted alphabetically.
  3. Identify non-letters and normalize.
    Anything that is not a letter is removed (while keeping the "sorted words" separated as different components)
  Then, in some embodiments, there is a comparison of the sorted list of components to all similarly sorted lists associated with (a) friends, (b) common brands, and (c) special words, such as "IT support". In some embodiments, this comparison is approximate, and is detailed below.
  Step 2: Comparison.
  In some embodiments, a module compares two lists of components, say (a1, a2) with (b1, b2, b3), and outputs a score.
  Here, (a1, a2) may represent the display name of a friend e.g., (a1,a2)=("Doe","John"), and (b1, b2, b3) the display name of an incoming non-friend email, e.g., (b1,b2,b3)= ("Doe", "Jonh", "K").

Next, the module compares all friend-names to the name of the incoming non-friend email. For each one, the following is done:
  1. Compare one component from each list, e.g., compare a1 and b1, or a1 and b2.
  2. Are two components the same? Add to the score with the value MATCH, and do not consider this component for this list comparison anymore.
  3. Is the "incoming" component the same as the first letter of the friend component? Add to the score with the value INITIAL, but only if at least one "MATCH" has been found, and do not consider this component for this list comparison any more.
  4. Is the similarity between two components greater than a threshold (such as 0.8)? Then add to the score. potentially weighted by the length of the string to penalize long matching strings more than short matching strings) with the value SIMILAR and do not consider this component for this list comparison any more.
  5. If there is any remaining components of the incoming message, add to the score by the value MISMATCH, but only once (i.e., not once for each such component)
  If the resulting score is greater than a threshold MATCH, then it is determined that there is a match.
  Here are some example value selections:
  MATCH=50
  INITIAL=10
  SIMILAR=30
  MISMATCH=−20
  In one alternative embodiment, the module sorts the components within each list alphabetically, if not already done. It then combines the components within a list by concatenating them. After this is done, it uses a string comparison algorithm on the resulted two concatenated results.
  Comparing Strings
  One example approach to compare strings is to use the Jaro-Winkler algorithm, or a version thereof.
  % In an alternative embodiment,
  % * If two long strings are very similar, that is more deceptive
  % than if two short strings are similar, and is given a higher score
  % * If one of the addresses is a "famous" address (name of CEO or
  % "Bank of America") then that is more deceptive than otherwise,
  % and is given a higher score
  One possible string comparison algorithm is the following:

```
package zapfraud;
public class DiffScore
{
// from
http://web.archive.org/web/20100227020019/http://www.census.gov/geo/msb/stand/strcmp.c
    /* strcmp95.c Version 2                                              */
    /* The strcmp95 function returns a double precision value from 0.0 (total
        disagreement) to 1.0 (character-by-character agreement). The returned
        value is a measure of the similarity of the two strings.         */
    // #include <ctype.h>
    // #include <string.h>
    // #define NOTNUM(c) ((c>57) || (c<48))
    static Boolean NOTNUM(char c) { return ((c>57) || (c<48)); }
    // #define INRANGE(c) ((c>0) && (c<91))
        static Boolean INRANGE(char c) { return ((c>0) && (c<91)); }
    // #define MAX_VAR_SIZE 61
    static final int MAX_VAR_SIZE=61;
```

```
// #define NULL60 ' '
static final char NULL60 = '\0';
//char[ ][ ] sp = new char[39][2];
    /*
    {'A','E', 'A','I', 'A','O', 'A','U', 'B','V', 'E','I', 'E','O', 'E','U',
    'I','O', 'I','U', 'O','U', 'I','Y', 'E','Y', 'C','G', 'E','F',
    'W';'U', 'W','V', 'X','K', 'S','Z', 'X','S', 'Q','C', 'U','V',
    'M','N', 'L','I', 'Q','O', 'P','R', 'I','J', '2','Z', '5','S',
    '8','B', '1','I', '1','L', '0','O', '0','Q', 'C','K', 'G','J',
    'E','', 'Y','', 'S',''};
    */
String base = "AAAABEEEIIOIECEWWXSXQUMLQPI2581100CGEYS";
String alt  = "EIOUVIOUOUUYYGFUVKZSCVNIORJZSBILOQKJ ";
int[ ][ ] adjwt;
public DiffScore( )
{
    int[ ][ ] adjwt = new int[91][91];
    /* Initialize the adjwt array on the first call to the function only.
        The adjwt array is used to give partial credit for characters that
        may be errors due to known phonetic or character recognition errors.
        A typical example is to match the letter "O" with the number "0"      */
    for (int i=0; i<91; i++) for (int j=0; j<91; j++) adjwt[i][j] = 0;
    for (int i=0; i<36; i++)
    {
        adjwt[base.charAt(i)][alt.charAt(i)] = 3;
        adjwt[alt.charAt(i)][base.charAt(i)] = 3;
    }
}
// double strcmp95(char *ying, char *yang, long y_length, int *ind_c[ ])
double score(String ying, String yang, String option)
{
/* Arguments:
    ying and yang are pointers to the 2 strings to be compared. The strings
    need not be NUL-terminated strings because the length is passed.
    y_length is the length of the strings.
    ind_c is an array that is used to define whether certain options should be
    activated. A nonzero value indicates the option is deactivated.
```

The options are:

ind_c[0] Increase the probability of a match when the number of matched characters is large. This option allows for a little more tolerance when the strings are large. It is not an appropriate test when comparing fixed length fields such as phone and social security numbers.

ind_c[1] All lower case characters are converted to upper case prior to the comparison. Disabling this feature means that the lower case string "code" will not be recognized as the same as the upper case string "CODE". Also, the adjustment for similar characters section only applies to uppercase characters.

```
    The suggested values are all zeros for character strings such as names.    */
    int pass = 0;
    // int[ ][ ] adjwt = new int[91][91];
    String ying_hold = "";
    String yang_hold = "";
    char[ ] ying_flag = new char[MAX_VAR_SIZE];
    char[ ] yang_flag = new char[MAX_VAR_SIZE];
    double weight, Num_sim;
    int minv, search_range, lowlim,
            hilim, N_trans, Num_com;
    int yl1, yi_st, N_simi;
    int i, j, k;
    /* If either string is blank - return - added in Version 2               */
    if (ying.isEmpty( )) return(0.0);
    if (yang.isEmpty( )) return(0.0);
    /* Identify the strings to be compared by stripping off all leading and
            trailing spaces.                                                  */
    ying = ying.trim( );
    yang = yang.trim( );
    // strncat(ying_hold,&ying[yi_st],ying_length);
    // strncat(yang_hold,&yang[j],yang_length);
    ying_hold = ying;
    yang_hold = yang;
    if (ying.length( ) > yang.length( ))
    {
        search_range = ying.length( );
        minv = yang.length( );
    }
```

```
        else
        {
            search_range = yang.length( );
            minv = ying.length( );
        }
        /* If either string is blank - return                            */
        /* if (!minv) return(0.0);   removed in version 2                */
        /* Blank out the flags                                           */
        // ying_flag[0] = yang_flag[0] = 0;
        // strncat(ying_flag,NULL60,search_range);
        // strncat(yang_flag,NULL60,search_range);
        search_range = (search_range/2) - 1;
        if (search_range < 0) search_range = 0; /* added in version 2    */
        /* Convert all lower case characters to upper case.              */
        ying = ying.toUpperCase( );
        yang = yang.toUpperCase( );
        /* Looking only within the search range, count and flag the matched pairs.
        Num_com = 0;
        yl1 = yang.length( ) - 1;
        for (i = 0;i < ying.length( );i++)
        {
            lowlim = (i >= search_range) ? i - search_range : 0;
            hilim = ((i + search_range) <= yl1) ? (i + search_range) : yl1;
            for (j = lowlim;j <= hilim;j++)
            {
                if ((yang_flag[j] != '1') && (yang_hold.charAt(j) ==
ying_hold.charAt(i)))
                {
                    yang_flag[j] = '1';
                    ying_flag[i] = '1';
                    Num_com++;
                    break;
                }
            }
        }
        /* If no characters in common - return                           */
        if (0 == Num_com) return(0.0);
        /* Count the number of transpositions                            */
        k = N_trans = 0;
        for (i = 0;i < ying.length( );i++)
        {
          if (ying_flag[i] == '1')
          {
                for (j = k;j < yang.length( );j++)
                {
                    if (yang_flag[j] == '1')
                    {
                        k = j + 1;
                        break;
                    }
                }
                if (ying_hold.charAt(i) != yang_hold.charAt(j)) N_trans++;
          }
        }
        N_trans = N_trans / 2;
        /* adjust for similarities in nonmatched characters              */
        N_simi = 0;
        if (minv > Num_com)
        {
            for (i = 0;i < ying.length( );i++)
            {
                if (ying_flag[i] == ' ' && INRANGE(ying_hold.charAt(i)))
                {
                    for (j = 0;j < yang.length( );j++)
                    {
                        int x = ying_hold.charAt(i);
                        int y = yang_hold.charAt(j);
                        if (yang_flag[j] == ' ' && INRANGE(yang_hold.charAt(j)))
                        {
                            if (adjwt[x][y] > 0)
                            {
                                N_simi += adjwt[x][y];
                                yang_flag[j] = '2';
                                break;
                            }
                        }
                    }
                }
            }
        }
```

```
            }
            Num_sim = ((double) N_simi)/10.0 + Num_com;
            /* Main weight computation.                              */
            weight= Num_sim / ((double) ying.length( )) + Num_sim / ((double)
yang.length( ))
                + ((double) (Num_com − N_trans)) / ((double) Num_com);
            weight = weight / 3.0;
            /* Continue to boost the weight if the strings are similar    */
            if (weight > 0.7)
            {
                /* Adjust for having up to the first 4 characters in common  */
                j = (minv >= 4) ? 4 : minv;
                for (i=0;((i<j)&&(yang_hold.charAt(i)
==yang_hold.charAt(i))&&(NOTNUM(ying_hold.charAt(i))));i++);
                if (i > 0) weight += i * 0.1 * (1.0 − weight);
                /* Optionally adjust for long strings.                */
                /* After agreeing beginning chars, at least two more must agree and
                    the agreeing characters must be > .5 of remaining characters. */
                if ((option.contains("ADJUST_LONG")) && (minv>4) &&
(Num_com>i+1) && (2*Num_com>=minv+i))
                if (NOTNUM(ying_hold.charAt(0)))
                {
                    weight += (double) (1.0−weight) *
                            ((double) (Num_com−i−1) / ((double)
(ying.length( )+yang.length( )−i*2+2)));
                }
            }
            return(weight);
        }
    } /* DiffScore */
```

Example Combining Logic:

The following is an example combining logic. '%' is the start of a comment and ':=' is an assignment statement in the logic below. Other embodiments are possible.

```
    Input: an email E, a protected organization O
    output: a classification corresponding to a conclusion
    process: determines a classification of an email received by a protected
organization
        process detail:
            % step 1: fact finding
            E.ResetVariables
            E.IsFriend := IsFriend(E)
            E.IsInternal := IsInternal(E)
            E.HowDeceptiveIsSender :=
HowDeceptiveIsSender(E,Recipient.contacts)
            E.HowManyRecipients:=HowManyRecipients(E,Recipient.address)
            E.IsFriend := IsFriend(E,Recipient.contacts)
            E.IsInternal := IsInternal(E,Recipient.domain)
            E.HasReplyTo:=HasReplyTo(E)
            If E.HasReplyTo then
            E.IsChameleon:=IsChameleon(E)
            If not E.IsChameleon then
                E.HowDeceptiveIsReplyTo:=
HowDeceptiveIsReplyTo(E,Recipient.contacts)
                E.IsAssociatedReplyTo:=
IsAssociatedReplyTo(Recipient.contacts,E)
                E.ReplyIsPromiscuous := ReplyIsPromiscuous(E)
                E.ReplyToDifferentDomain :=ReplyToDifferentDomain(E)
                E.ReplyToPromiscuous:=Promiscuous(E.ReplyTo)
            % step 2: logic
            % logic -- temporary ATO & Spoof detection
            If    E.HasReplyTo and not E.IsChameleon % a replyto to pay attention
to
                    and
                (E.IsFriend or E.IsInternal) % a trusted sender
                    and
                (E.HowDeceptiveIsReplyTo > DeceptiveReplyToThreshold) %
bad replyto
                    then
                E.Classification := VeryHighRisk
            If    E.HasReplyTo and not E.IsChameleon % a replyto to pay attention
to
```

```
                             and
                             and(E.IsFriend or E.IsInternal) % a trusted sender
                             and
                             not E.IsAssociatedReplyTo % sender has not used this before
                             and
                             (E.ReplyToDifferentDomain or E.ReplyToPromiscuous)
                             % the reply-to domain is different from sender domain
                             % or the sender is promiscuous (in which case different
                             % does not matter)
                             then
                             E.Classification := HighRisk
                             If (E. HowManyRecipients=1) % only one recipient in protected
org
                             and
                             E.ContentRiskClassification = VeryHighRIsk % content bad
                             then
                             E.Classification := VeryHighRisk % upgrade risk
                 % Here, a message may be sent to the apparent sender of the message,
                 % requiring an action in order for the message to be delivered to its
recipients
                 % logic -- permanent ATO detection
          If     not E.HasReplyTo % no replyto
                 and
                 (E.IsFriend or E.IsInternal) % a trusted sender
                 and
                 (E. HowManyRecipients=1) % exactly one recipient in protected org
                             then
                 E.Classification := E.ContentRiskClassification % review content
                 If E.Classification = VeryHighRisk
     then
                             E.Classification := HighRisk % downgrade to avoid block
                             % Here, the messages is optionally considered for
                 % quarantine until the sender has responded to a
                             % secondary channel challenge, indicating that the message
                             % should be delivered
     % Here, a message may be sent to a valid channel associated with the sender of
the message,
% requiring an action in order for the message to be delivered to its recipients
                 % logic -- cousin-name detection
                 if     not (E.IsFriend or E.IsInternal) % not a trusted sender
                             and
                             (E.HowDeceptiveIsSender > HighDeceptiveSenderThreshold)
                             % obviously bad
                             then
                             E.Classification := VeryHighRisk
                 else if not (E.IsFriend or E.IsInternal) % not a trusted sender
                             and
                             (E.HowDeceptiveIsSender > MediumDeceptiveSenderThreshold)
                             % likely bad
                             then
                             E.Classification := HighRisk
                             If E.ContentRiskClassification = VeryHighRisk % risky content
                             then
                             E.Classification := VeryHighRisk % upgrade
                 else if not (E.IsFriend or E.IsInternal) % not a trusted sender
                             and
                             E.ContentRiskClassification = VeryHighRisk % risky content
                             then
                             E.Classification := HighRisk % downgrade due to
lack of info
                 % detecting phishing
                             If not E.Isfriend then
                                  if NewDomain(E.from) then
                                       {one of the following, based on what we decide on:
                                          {If PotentialPhishingURLs(E) then
                                          E.ContentRiskClassification =
VeryHighRisk}
                                          or
                                          {ProtectPhishingURLs(E)}
                                       }
                 % at the very end, when the classifications of E have been entirely
completed
                             if (E.Classification = Safe) and AddToRecordedReplyTo
                                  then
                                  NowRecordReplyTo(E)
```

```
            if (E.Classification = VeryHighRisk)
                then
                    Unfriend((E.from).address, C) % remove offender from
friend list.
```

ContentRiskClassification

In many contexts, it is important to perform an in-depth scan of the email contents. In one embodiment, this is performed as follows:

0. Set the content score to zero. In some embodiments, this score is conditionally modified as the following example scan is performed:

1. Does the message have an attachment?
  a. If yes to (1), does the attachment have a high-risk word in its name?
    i. If yes to (1a), then add a value to the score for that, such as 4.
  b. If yes to (1), was the attachment generated using a free service?
    i. If yes to (1b), then add a score for that, such as 7.
  c. If yes to (1a) or (1b), then scan the contents of the attachment and add a score related to the result, where this score may be a value from 0-9, and depend on the presence of keywords associated with risk. For example, the word "invoice" may correspond to 2 points, while the word "wire" or the term "Western Union" may correspond to 4 points.
2. Does the message have a high-risk word in its subject line?
  a. If yes to (2), then add a value to the score for that. For example, the same scoring as performed in step 1c may be used, or a similar method with different terms and different scores.
3. Does the message match a vector filter rule?
  a. If yes to (3) then add a value to the score for that, based on the hit. Vector filter rules are described below.
  b. Does the vector filter rule correspond to a whitelisted brand? (In one embodiment, this is determined based on the family the rule belongs to, where different rules belong to different families; in another embodiment, the system maintains a list of whitelisted brands.)
    i. If yes to (3b) then add a score for that, except if the sender is associated with the brand (i.e., "Bigfoot" sends email for JP Morgan, as does JP Morgan.)
    ii. If yes to (3b) then is the whitelisted brand associated with URLs?
      1. If yes, then determine whether the message contains any URL not associated with the whitelisted brand, and add a value to the score for that. One example of this value may be 12.
4. Is there presence of obfuscation in the message (e.g., mixed or high-risk charsets)?
  a. If yes to (4), then add a value to the score for that, such as 9.
5. Is there a likely presence of spam poison? To determine this, a collection of heuristic verifications can be performed. For example, in one embodiment, it is verified whether the message has two text parts, each containing at least 25 characters, and these components are separated by at least 15 contiguous linefeeds. If this is satisfied, then the message is determined to have a likely spam poison component.
  a. If yes to (5) then add a value to the score for that, such as 7.
6. Does the message match a storyline?
  a. If yes to (6), then add a value to the score for that, such as a value between 0 and 15, where this value is computed by matching the content to one or more collections of terms.

Periodic Maintenance:

In addition, in some embodiments, periodical maintenance is performed. Example processes are described:

UpdateFriends

```
        input: an email address A, contact list C of protected account,
Inbound
        process: update C, when applicable
        The variable Inbound is Boolean, and indicates whether the
function is called because as a result of an inbound email with
address A or not (i.e., an outbound email with address A.)
        For each email E sent to a protected account P, then we call
UpDateFriends(E.from, P.contacts, true)
        For each email E sent from a protected account P, then we call
UpDateFriends(A, P.contacts, false) for each recipient account A
(i.e., to, cc and bcc)
        detailed process:
        If there is a record Ci such that (Ci.A=A) then
                If Ci.DateQualified != nil then
                        If Ci.DateQualified +
FriendDelayThreshold < (today's date)
                                then
                                        Ci.friend := true
                                else
                                        If InBound then
                                                Ci.NumberEmailsTo++
                                        else
                                                Ci.NumberEmailsFrom++
                                        If QualifiesAsFriend
(Ci.NumberEmailsTo,Ci.NumberEmailsFrom) then
                                                Ci.DateQualified := (today's date)
                else        % consider creating a record
                        If not IsInternal(A.domain)
                                then
                                        Create a new record Ci and insert it in C
                                        Ci.A := A
                                        Ci.DateQualified:=nil
                                        Ci.NumberEmailsTo:=0
                                        Ci.NumberEmailsFrom:=0
                                        Ci.friend := false
                                        If InBound then
                                                Ci.NumberEmailsTo++
                                        else
                                                Ci.NumberEmailsFrom++
                        In some embodiments, the above function uses
the following internal routine:
        QualifiesAsFriend
                input: NumberEmailsTo, NumberEmailsFrom
                return ((NumberEmailsTo>ToThreshold) or
(NumberEmailsFrom>FromThreshold))
                Where example values are
                        ToThreshold = 2
                        FromThreshold = 4
```

PruneAssociatedReplyTo

--- process:
For all protected users, review all their contacts Ci.
If any Ci has a Ci.AssociatedReplyTo (which is an address) that is on the global list ChameleonList, then remove that entry Ci.AssociatedReplyTo. The entry is not harmful, but it is also not useful.
When: Periodically.

---

Cousin Clearinghouse

A cousin attack is a type of scam in which a deceptive address is used, whether in an email or in a URL.

Scammers will attempt to trick email receivers by using a close copy of a legitimate domain. These are called cousin domains. For example, www.pavpal.com looks very similar to www.paypal.com. Scammers can create cousin domains in a variety of ways including adding letters, omitting letters, reversing letters, adding punctuation or using alternate character sets such as Cyrillic to create homographs. Scammers can use a different top level domain (TLD) extension such as www.paypal.tv. Scammers can also combine a domain name with other words such as www.paypal_service.com or create a subdomain such as service.paypalservice.com. Since the number of possible character replacement and word combinations is effectively unbounded, it can be difficult to predict all possibilities.

In some embodiments, the Cousin Clearinghouse is an enumeration of bad cousin domains that email service providers and browsers or browser plugins can query to detect spoofed email and spoofed web page attempts. When mail services or browsers find these domains they can take appropriate action like block the traffic or provide an in context warning to the user. For example:

The URL www.pavpal.co/login.html appears to be a spoof of the legitimate site PayPal.com. This is likely a scam site and you should proceed. Click Here to be Safe, but if you wish to proceed please confirm. YES, I UNDERSTAND THE RISK.

The email below has been sent by a sender that appears to have a spoofed domain. This is likely a scam, so you should delete this email.

The email below has a contains a link that appears to be a spoofed domain. This is likely a scam, so you should not proceed.

You have a received and email from a sender that appears to come from a spoofed domain. This email has been quarantined for security, but can be viewed if you wish. Please confirm if you want to view this email: YES, I UNDERSTAND THE RISK.

In some embodiments, the Cousin Clearinghouse can be queried via a secure internet connection or a cached list of bad domains can be pushed (or pulled) from a service.

In some embodiments, the Cousin Clearinghouse can be populated by a constant proactive scanning of new domain registrations. As new domains are published they can be detected and scored based on a variety of factors including:

Contains one or more words or names representing a known brand. For example, contains "paypal".

Contains one or more words or names similar to a known brand. For example, contains "pavpal"

Contains one or more homographs that makes the domain appear similar to a known good domain. For example, www.paypal.com could be represented with Cyrillic 'a'.

Is hosted by a service provider that has been previously detected to have hosted cousin domains.

Is hosted by a service provider that is not in the country where the domain is pretending to be. For example, www.pavpal.com could be hosted in the Ukraine with an all English web site.

Cousin domain contains text or image content that is the same or similar to the known good site.

Uses a different TLD than the known good site like www.paypal.co

A person can manually review the email

In some embodiments, the Cousin Clearinghouse can also receive reports from corporations or end users that find suspect domains names. These can be reported in a variety of ways, including:

Suspicious emails can be manually forwarded by users to an automated email address like spoof@zapfraud.com.

Emails can be automatically forwarded if they are found to be suspicious by filters at the mail service.

Email addresses can be manually reported through a web page

A list of email addresses can be uploaded as a file through a web page

Email addresses can be automatically reported from a mail service via an internet service connection In some embodiments, the domains found in these reports can be validated against the criteria identified above.

Detecting Relationships Through Display Name Management

In some embodiments, Display Names can be included before the actual email address. For example, "Super Genius" is the Display Name in "Super Genius" <wiley.e.coyote@acme.com>. Outbound email usually contains a Display Name as part of the From address.

Receiving mail services or mail clients often capture this Display Name so that it can be used in mail clients when the receiver wants to send a message back later, since it is much easier to show a display name such as "Bob Smith" rather than a more convoluted email that it represents, such as smith-b181703@obscuredomain.com. The previously received Display Name is then automatically used in the To: field of outbound email to the known account. So a sender that knows the receiver should use the correct Display Name when sending to that email. In one example, if the Display Name is something such as "Happy User" instead of "Bob Smith" this is a strong indication that the sender probably does not know the receiver. If the Display Name is "Robert Smith" when Bob has never used that Display Name, then this is a strong indication that this is someone that Bob does not know. If the Display Name is missing completely, that may also be an indication that the sender does not know the receiver. If the sender does not include the proper Display Name for the receiver, the message can be scored as being more suspicious. This can be used by itself or in combination with other scam indicators to decide the disposition of the message.

In some embodiments, display names are modified to make them harder to guess by senders that do not really know the receiver. For example, "*Bob Smith*" or "*Bob Smith*" or similar variations would not be easy to guess by scammers. In some embodiments, changes are randomized per account so that they cannot be easily guessed by a scammer. If a message contains, for example, a To: address with a plain "Bob Smith," in some embodiments, it is scored as a potential scam since it lacks the additional decoration that distinguishes display names that originated from the account holder.

In some embodiments, the display name is automatically modified to change based on a schedule and/or when an event occurs. For example, in January the display name for the account could be "*Bob Smith*", then changed to "!Bob Smith!" in February and "**Bob Smith!" in March. Alternatively, the change can be triggered when too much SPAM email is received by an account. By switching to a new display name, older display names can be recognized as potentially suspicious.

In various embodiments, the Display Names can include Unicode characters for example "☆Bob Smith ✯ " or can use homograph characters such as a Cyrillic 'h' in "Bob Smith' or invisible characters such as Tab or other invisible Unicode characters Another example approach is to use a title such as "Bob Smith, CFO" or "Bob Smith C.F.O." in the display name so that only senders that have received email from Bob would know what Bob appends.

In some embodiments, by changing the Display Name and recording when it was changed, it is possible to recognize/determine how old a connection is to a previous sender.

Where Display Names can be accessed in a central location, in some embodiments, the modification of Display Names can be modified programmatically or manually. For example, if Linux display names are stored in the /etc/passwd file such as:

bob:x:1001:1001:*Bob Smith*:/home/bob:/bin/bash these can be easily accessed for updates. In other cases, the display names may be stored in a database, such as a database containing Microsoft Exchange Server accounts, or directory structure like LDAP.

Additional Figures

Figure 3:
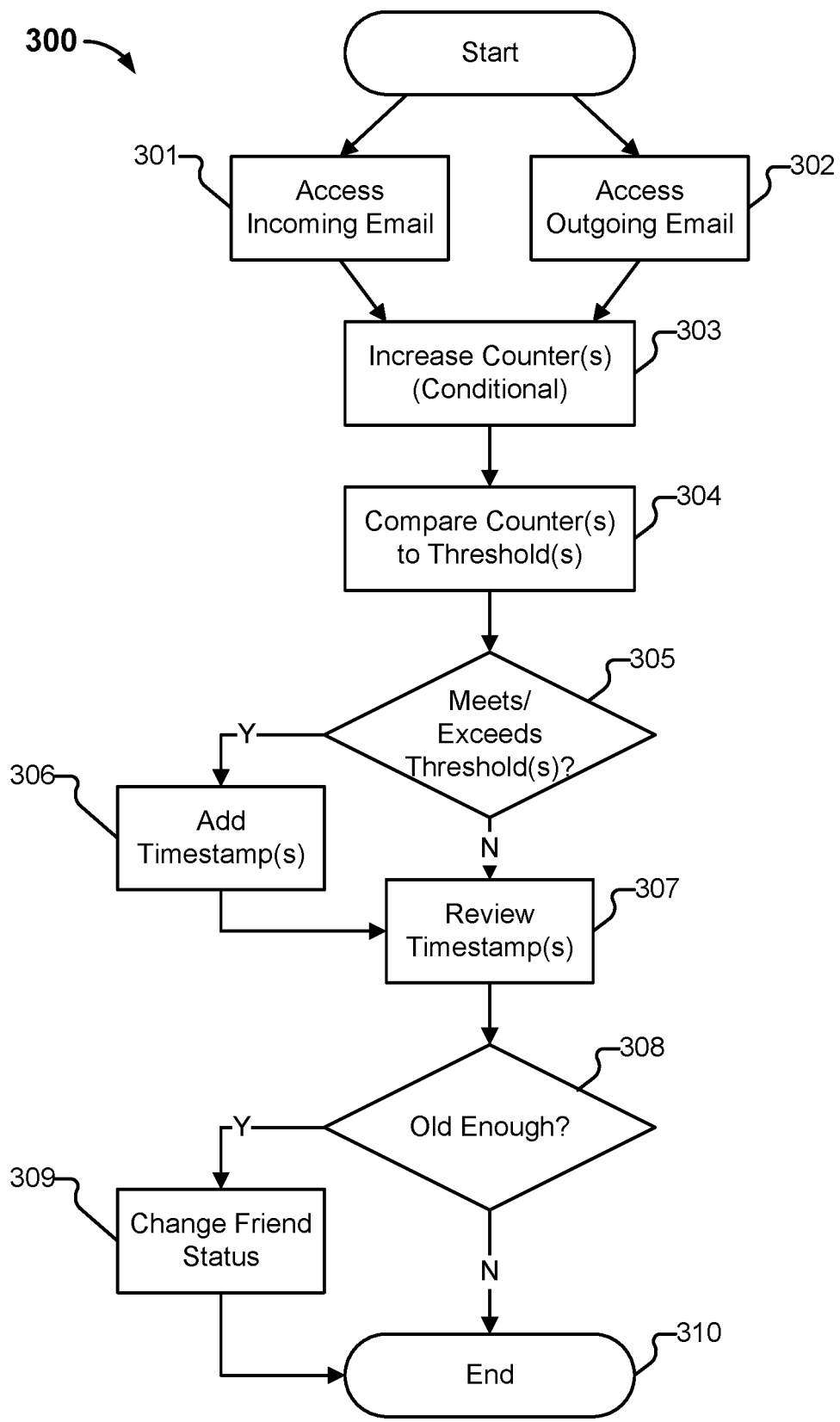
FIG. 3 illustrates an example process to determine that an account is a friend.

FIG. 3 illustrates an example process to determine that an account is a friend. In some embodiments, the example process 300 of FIG. 3 is executed using the scam detection system described herein (e.g., scam detection system 100). At 301, incoming email is accessed, and the contents of the "from" field are determined. In an alternative embodiment, the contents of the "sender" field are also determined. This need not be done in real-time, but can be done in batch mode, including at account enrollment or subsequent processing of (all) email message headers.

At 302, the system accesses an outgoing or sent emails, and determines the contents of the "to", "cc" and "bcc" fields. This need not be done in real-time, but can be done in batch mode, including at account enrollment. At 303, one or more counters are conditionally increased, based, for example, on the accounts determined at steps 301 and/or 302. For example, if at 301 it is determined that an email address E1 is used for sending an email to a protected account, then at step 303, a counter associated with E1 and with incoming email is increased. Similarly, if, for example, at 302 it is determined that an email address E2 is a recipient of an email from a protected account, then at step 303, a counter associated with E2 and with outgoing email is increased. Thus, in one embodiment, there is one counter for each email address from which email is received or to which email is sent. In one embodiment, the increase of the counter(s) is conditional on a maximum value for the counter(s) not having been reached. At 304, the one or more counters associated with an email account (E1 or E2) identified at 301 and/or 302 are compared to one or more thresholds. At 305, it is determined whether the one or more counters meet or exceed one or more thresholds. In one embodiment, all counters associated with an email account have to exceed their respective thresholds, whereas in another, at least one of the counters associated with an email account has to exceed its associated threshold. The email account is E3, which may be different from E1 and E2, or which may match one or both of these. If the threshold was exceeded then step 306 is performed; otherwise, step 307 is performed. At step 306, a time stamp is recorded. This corresponds to when the email account was determined to have met the requirement for being a friend, based, for example, on at least one of incoming traffic and outgoing traffic, or a combination of these. At 307, at least one timestamp is reviewed to determine if it is sufficiently old, i.e., a sufficient time has elapsed since the timestamp was recorded. In one example embodiment, that time is two weeks or anything exceeding two weeks. At 308, the comparison is performed if the timestamp is old enough, and if it is, step 309 is performed; otherwise step 310 is performed. At step 309, it is recorded that the account E3 for which the time-stamp was found to be old enough is a friend of the protected account. An example embodiment is described above, in the procedure called "UpdateFriends". In an alternative embodiment, the determination of who is a friend is not done with respect to a protected account, but instead, with respect to a protected organization. That would mean that the counters described above would not be specific to a unique protected account within an organization, but instead, all users within the same organization would use the same counters. In other words, if one email to a first user in an organization is received, and then a second email to a second email in the same organization is received, and the emails are from the same sender, then the same counter would be increased twice.

Figure 4:
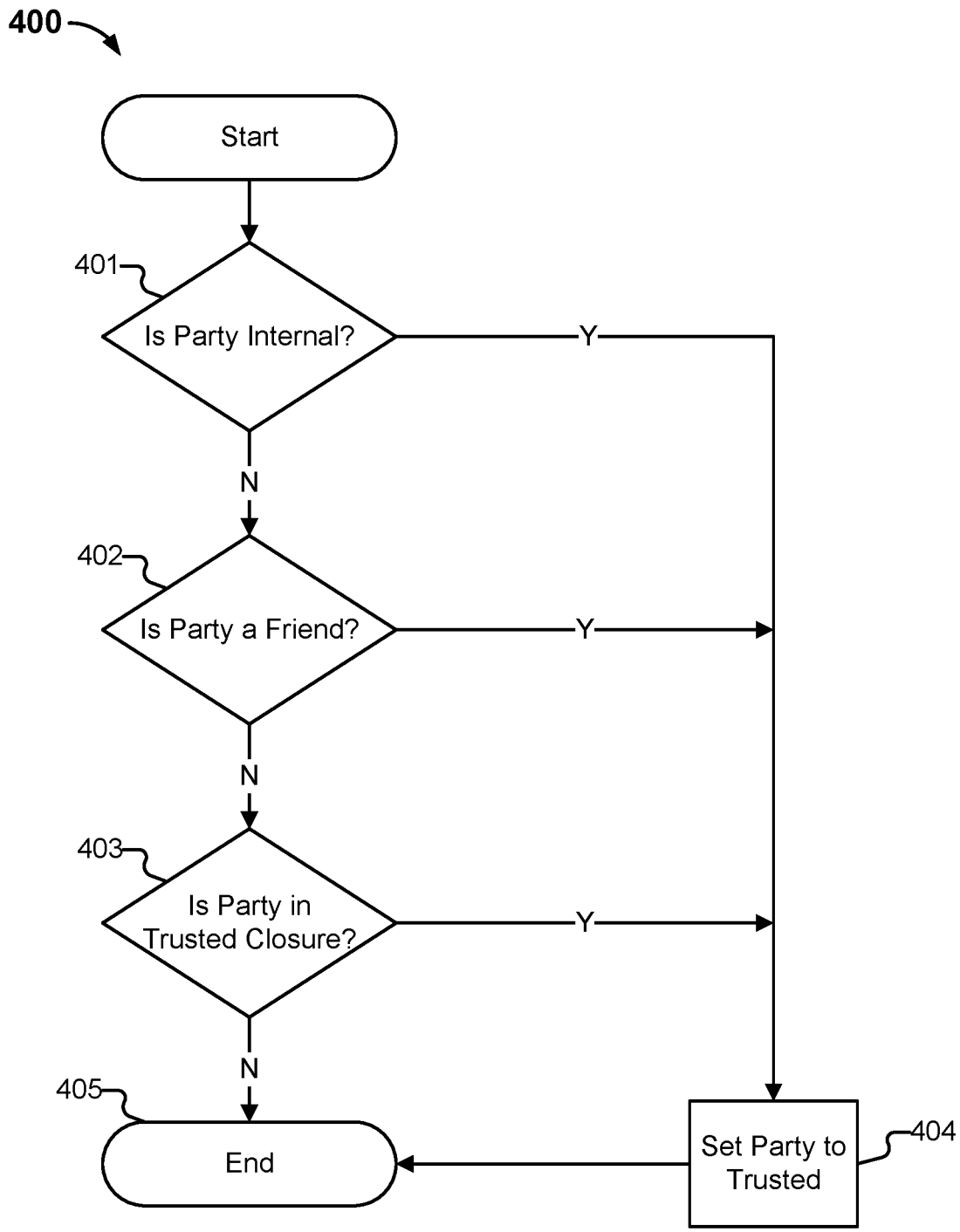
FIG. 4 illustrates an example process to determine that an email sender is trusted.

FIG. 4 illustrates an example process to determine that an email sender is trusted. In some embodiments, the example process 400 of FIG. 4 is executed using the scam detection system described herein (e.g., scam detection system 100). It is determined whether the party is internal at step 401. In some embodiments, two parties are internal to each other if they have email addresses within the same organization, and this is an organization that is being protected. It is not necessary for them to have the same domain name in their email addresses, as some organizations may use multiple domains. In some embodiments, a list of associated domains is consulted to determine whether a party is internal. In addition, an enterprise can add—temporarily or permanently—domains or email addresses corresponding to collaborators, and to personal email addresses of employees of the organization or collaborating organizations. If a party matches such a list, in some embodiments, it is considered internal. If a party is internal, then the processing proceeds to 404. If not, it is determined at step 402 whether the party under consideration is a friend. In some embodiments, a party is a friend of a protected account if this has been recorded, for example, at step 309 in the example process described in conjunction with FIG. 3. As is also described in the exemplary embodiment, in some embodiments, a party is a friend if it belongs to an organization that is a friend of the party relative to which the determination is made. If the party being considered is a friend, then step 404 is performed, otherwise step 403. At step 403, a transitive closure algorithm is evaluated based on a configuration associated with the protected account. In one embodiment, the transitive closure algorithm specifies that any friend of a party who is internal is a friend. Alternative transitive closure algorithms can be used. If the party considered is in the transitive closure, the processing continues to step 404, otherwise to step 405. At step 405, the processing to determine that an email sender is trusted concludes. At step 404, the party is set to be trusted.

Figure 5:
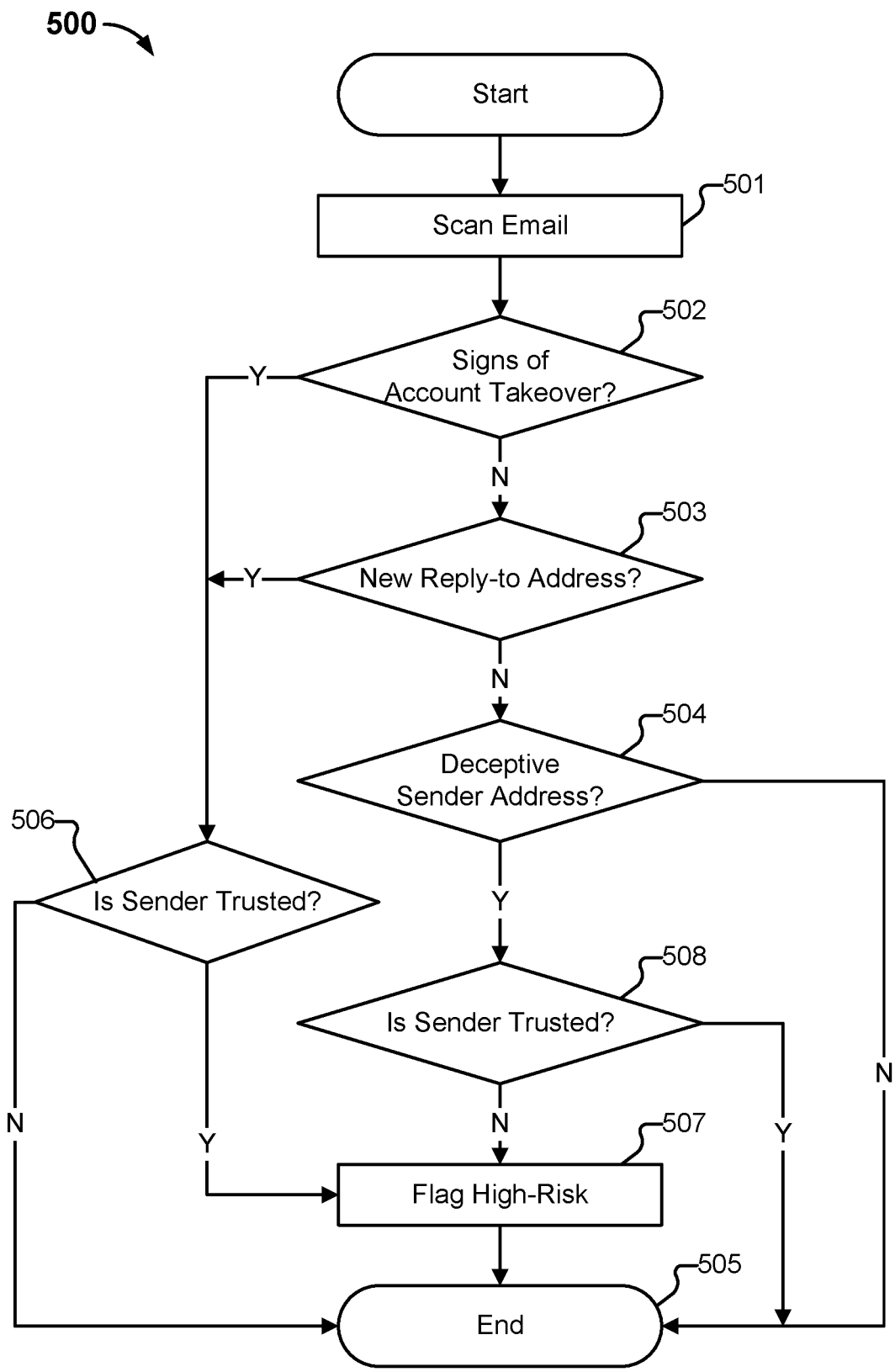
FIG. 5 illustrates an embodiment of a simplified non-monotonically increasing filter.

FIG. 5 illustrates an embodiment of a simplified non-monotonically increasing filter. In some embodiments, the example logic of FIG. 5 is implemented using the scam detection system described herein (e.g., scam detection system 100). At 501, an incoming email is scanned. At 502, it is determined whether there are signs of an account-takeover (ATO) in the incoming email. In one embodiment, this test also includes a determination of likely spoofing attempts. Examples of such signs include new signature files, new display names, high-risk email content, and email delivery paths that are abnormal, including containing at least two more hops than typically recorded for this sender or including nodes that are not normally on the delivery route for this sender. If there are signs of ATO, then the logic/process proceeds to 506, otherwise to 503. At 503, it is determined if the email has a reply-to address that is not previously associated with the sender for emails that were considered safe. If this is determined to be true, then the process proceeds to step 506, otherwise to 504. In step 504, it is determined whether the sender email address is deceptive. In some embodiments, this corresponds to the sender obtaining a deceptive score exceeding a threshold, such as at least 70 out of 100, where an example deceptive scoring algorithm is described in the pseudo code of the exemplary embodiment. If the deceptive score exceeds the threshold, then the address is considered deceptive, and the process continues to step 508, otherwise to step 505. In 505, the non-monotonic scan concludes. Step 506 and step 508 both determine whether the sender is trusted, and the same processing can be used to determine this. In some embodiments, they are different in terms of the action, though. At step 506, an email is considered dangerous if the sender is trusted, whereas at step 508, an email is considered dangerous if the sender is not trusted. This is an example of a non-monotonic combining logic. If the email is considered dangerous, then the process continues to 507, where it is labelled high-risk; otherwise to 505.

Figure 6:
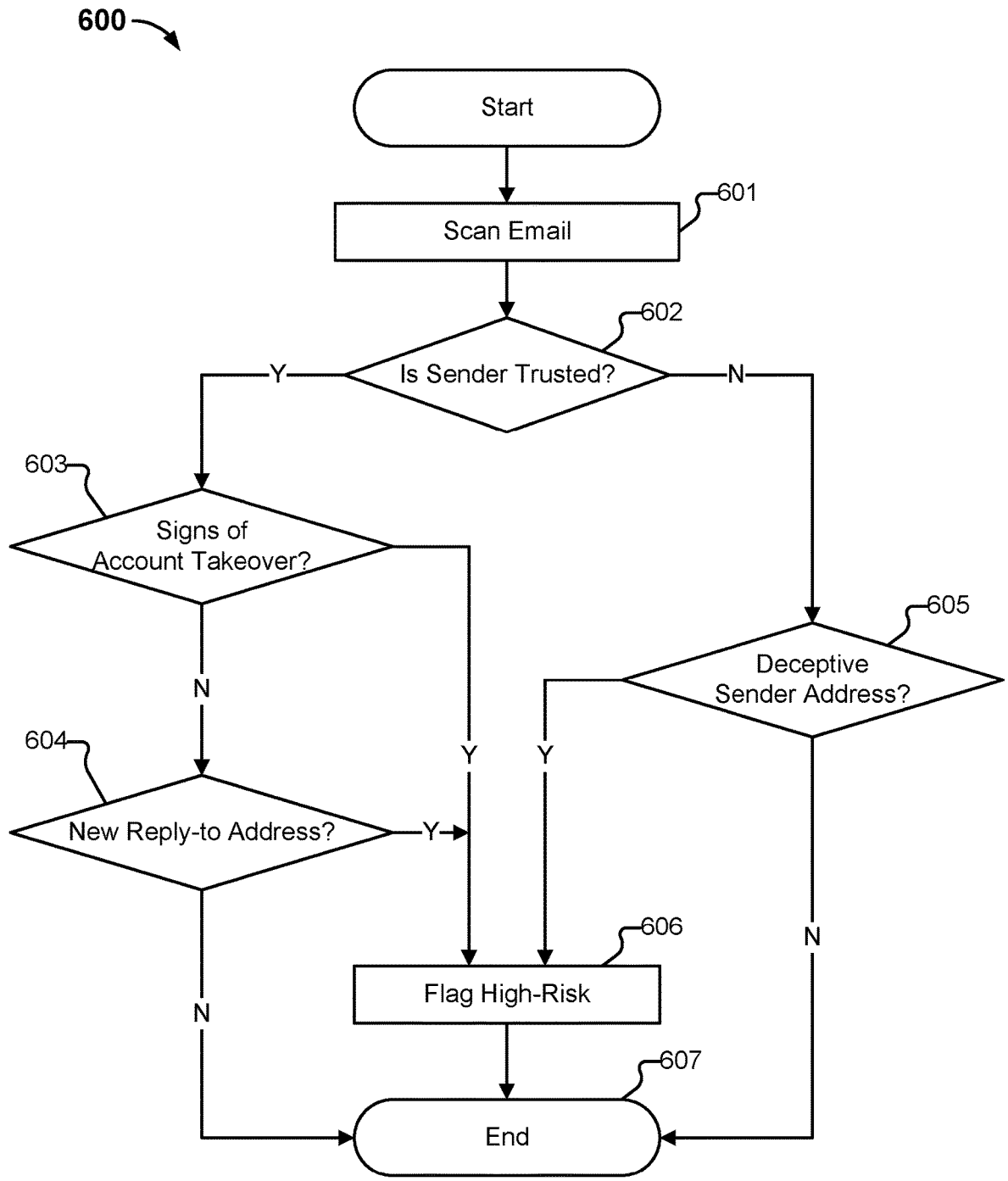
FIG. 6 illustrates an alternative embodiment of a non-monotonic combining logic.

FIG. 6 illustrates an alternative embodiment of a non-monotonic combining logic. In some embodiments, the example logic of FIG. 6 is implemented using the scam detection system described herein (e.g., scam detection system 100). At 601, an incoming email is scanned, similarly to at 501 of FIG. 5. In 602, it is determined whether the sender is trusted, similar to at 506 and 508 of FIG. 5. If the sender is determined to be trusted, then the logic/process continues to 603, otherwise to 605. At 603, it is determined whether the email has signs of account take-over, using a process that could be essentially the same as in 502. If it is, then the process continues to 606, otherwise to 604. At step 604, it is determined if the email has a new reply-to address, similarly to as was also described at 503 in FIG. 5. If this is determined to be true, then the process continues to 606, otherwise to 607. At step 605, it is determined whether the sender address is deceptive, which can be done, for example, similarly to as at 504 of FIG. 5. If that is true, then the process continues to 606, otherwise to 607.

Figure 7:
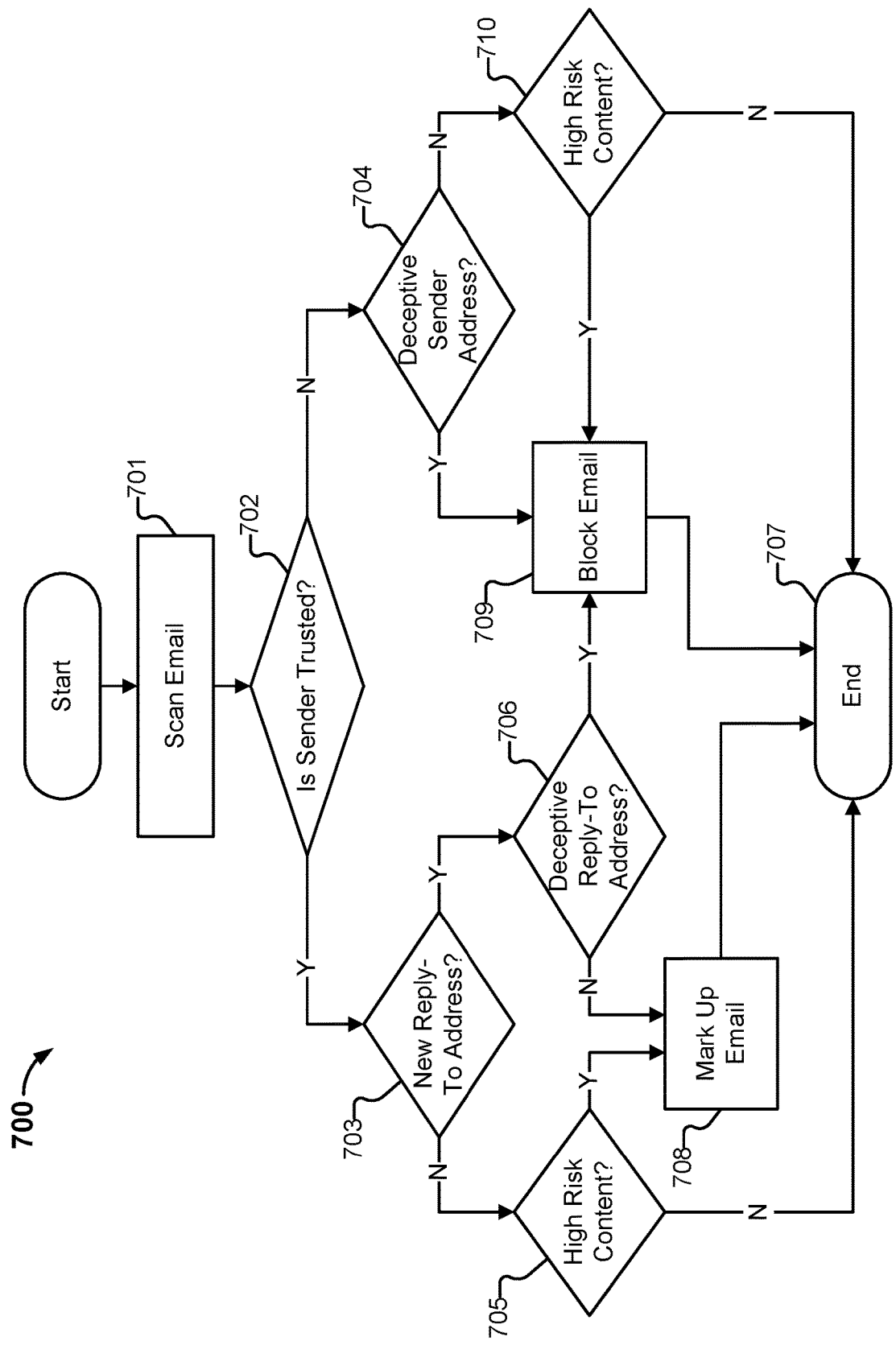
FIG. 7 illustrates a second alternative embodiment of a non-monotonic combining logic.

FIG. 7 illustrates a second alternative embodiment of a non-monotonic combining logic. In some embodiments, the example logic of FIG. 7 is implemented using the scam detection system described herein (e.g., scam detection system 100). At 701, an incoming email is scanned, for example, similarly to as at 501 of FIG. 5. At 702, it is determined whether the sender is trusted, for example, similarly to as described at 602 of FIG. 6. If the sender is trusted, the logic/process continues to 703, otherwise to 704. At 703, it is determined if the email has a new reply-to address, for example, similarly to as at 503 of FIG. 5. If it did, then the logic/process continues to 706, otherwise to 705. At 704, it is determined whether the sender email address is deceptive, similarly to as at 605. If it is determined to be deceptive, then the logic proceeds to 709, otherwise to 710. At 705 and 710, it is determined whether the email has high-risk content. In some embodiments, this is done by scanning the text portions for keywords such as "invoice" and "wire", that are associated with high risk, and to convert potential attachment to text and determine whether this text contains keywords associated with high risk. Steps 705 and 710 can be the same process, except that in some embodiments, the determinations result in different actions. At 705, high risk content causes step 708 to be performed, where the incoming email is marked up, whereas at 710, high risk content causes step 709 to be performed, where the email is blocked. A negative determination in both 705 and 710 leads to going to step 707, where the processing of the email ends. Step 708 corresponds to an action taken on emails that are high risk but which the recipient would not want to lose if the emails are legitimate. In some embodiments, these emails are marked up with warnings. Alternatively, these emails are quarantined. Step 709 corresponds to high-risk emails that are blocked. In this example, it can be seen that the actions taken after a determination in steps 705 and 710 depends on the determination made in step 702, which is a non-monotonic filtering logic.

Figure 8:
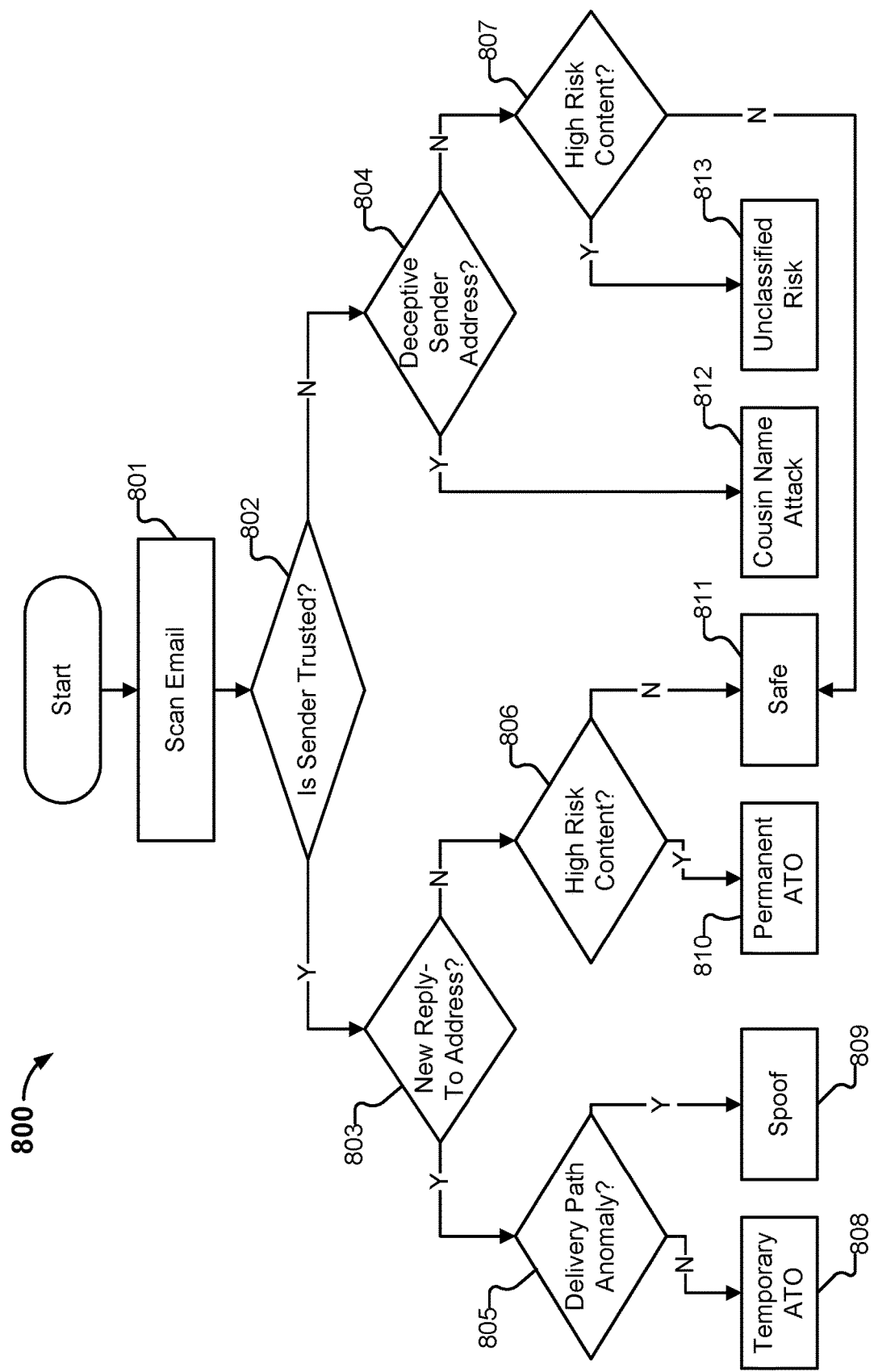
FIG. 8 illustrates an example process for classification of primary risks associated with an email, using a non-monotonically increasing combining component.

FIG. 8 illustrates an example process for classification of primary risks associated with an email, using a non-monotonically increasing combining component. In some embodiments, the example process 800 of FIG. 8 is executed using the scam detection system described herein (e.g., scam detection system 100). At 801, an email is scanned. At 802, it is determined whether the sender is trusted. If the sender is trusted, the process proceeds to 803, otherwise 804. At 803, it is determined if the email has a new reply-to address. If it does, then the process proceeds to 805, otherwise 806. At 805, it is determined whether the email has a delivery path that is anomalous, such as containing nodes that have not previously been recorded as being on the path for emails associated with the sender of the scanned email, or having a path that is at least, for example, two hops longer than previous delivery paths associated with the sender of the email. If the delivery path is anomalous, then the process proceeds to 809, otherwise 808. At 806 and 807, it is determined if the email has high-risk content. If this is true in the determination at 806, then the process continues to 801, otherwise to 811. If the email is found to have high-risk content at 807, then the process continues to 813, otherwise 811. Here, 808 corresponds to temporary account take-overs, which are characterized by an attacker with temporary access to an account he has gained illegitimate access to (e.g., by phishing the owner), while the owner is likely to also have access. 809 corresponds to spoofed emails, such as emails sent through open relays. 810 corresponds to permanent account take-overs, which are characterized by an attacker with access to an account he has gained illegitimate access to (e.g., by phishing the owner), while the owner is likely not to have access to the account anymore. This means that it may not be meaningful to alert the account owner by sending a message to the email account. 811 corresponds to an email that is likely to be safe. Step 812 corresponds to a so-called cousin-name attack. This is an attack in which a criminal creates an account or registers a domain with the intent to deceive a recipient to believe that he is somebody they trust. 813 corresponds to a high fraud risk that is not classified. Additional tests and processing can be applied to emails that result in this determination, to further identify what attack they are associated with. It may be useful to automatically determine the likely cause of a problem, as this helps remediate the problem.

For example, if it is determined that an account is likely to have suffered a temporary account take-over (808), then an alert is sent to the administrator of the account, who may turn off any remote access to the account while still allowing access from the enterprise site. All traffic from the account is then be automatically marked up with warnings by the system that first detected the problem, until the administrator responds that the password has been reset. This includes email traffic to other users than the user whose received email set off the alert. If a permanent account take-over is suspected, on the other hand, an alert is sent to the administrator, who then may investigate whether this is correct, since the false positive rates of this determination are substantially higher than for temporary account take-overs. If the administrator determines that the account was indeed taken over, he may lock the offending account down. Until a confirmation is received from the admin, the system detecting the possible permanent account take-over, in some embodiments, places all emails from the account identified as suffering a permanent account take-over in quarantine if they contain an attachment, and mark them up with warnings otherwise. Compare this reaction to that in 812, where traffic from the sender of the scanned email would simply be blacklisted, and all email from this sender rejected onwards, whether sent to the same recipient as the scanned email, or to another recipient protected by the system.

Figure 9:
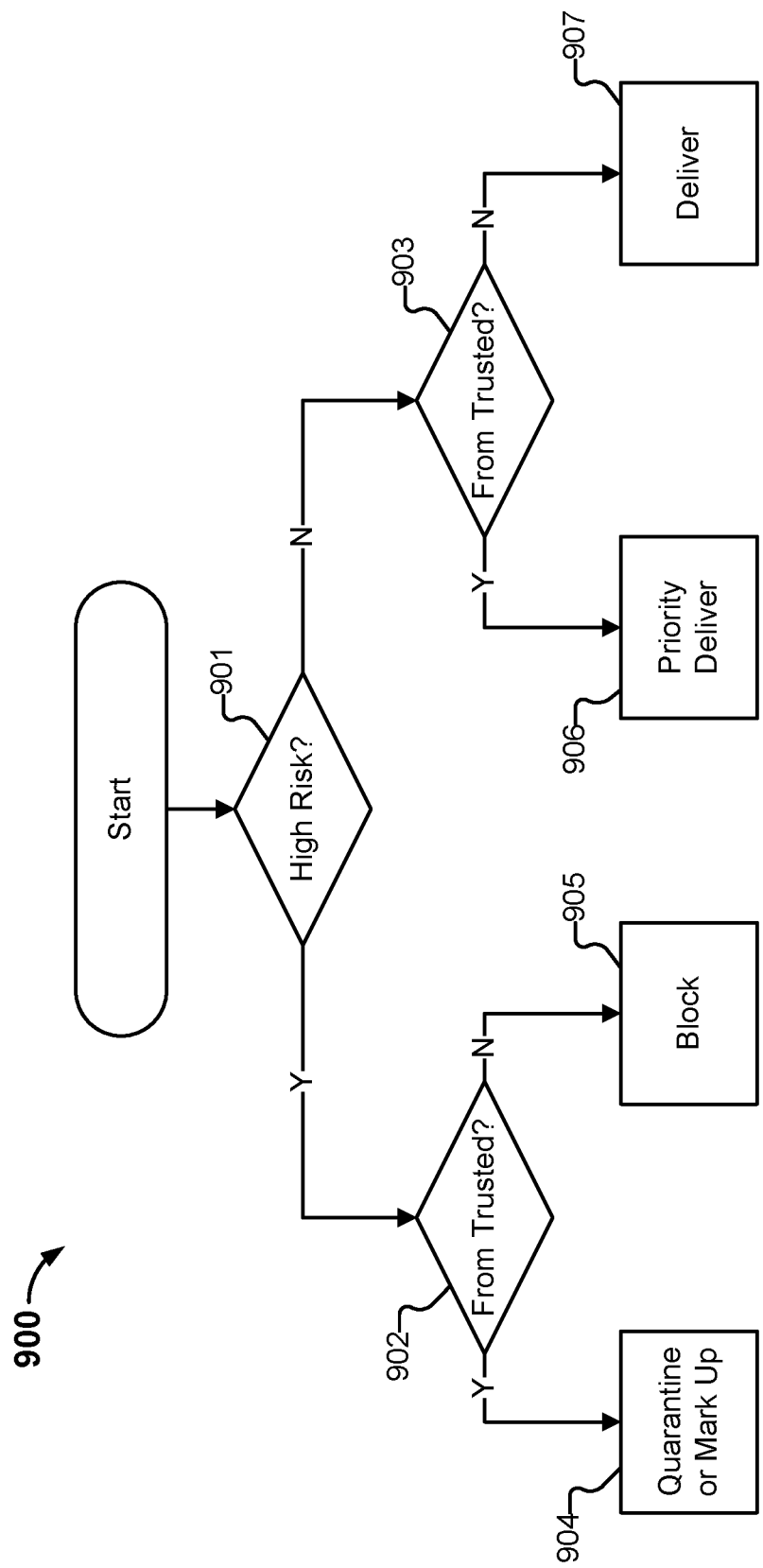
FIG. 9 illustrates an example embodiment of a process to identify what messages should be quarantined based on both high risk and a reasonable likelihood of being legitimate.

FIG. 9 illustrates an example embodiment of a process to identify what messages should be quarantined based on both high risk and a reasonable likelihood of being legitimate. In some embodiments, the example process 900 of FIG. 9 is executed using the scam detection system described herein (e.g., scam detection system 100). At 901, it is determined whether an email is considered high risk based, for example, on contents, headers, attachments and transmission context, and history. In some embodiments, the transmission context includes other messages in the same thread, and the history includes past classifications of messages from the same sender. If the email is considered high risk, then the process proceeds to 902, otherwise to 903. At both 902 and 903, it is determined whether the message comes from a trusted party. At 902, if it does, then the process proceeds to 904, otherwise to 905. At 903, if it does, then the process continues to 906, otherwise 907. Here, in this example, 904 corresponds to quarantining or marking the message up. In some embodiments, the decision of whether to quarantine or mark up is based on additional determinations and preferences set by the user or an admin associated with the user; where the user corresponds to the party who is the recipient of the email. At 905, the email is blocked. In some embodiments, blocking also includes reporting of the message to an admin, whether individually or in aggregate. An aggregate reporting can notify the admin of how many messages sent from or to a particular user were blocked, or what fraction of such messages was blocked. At 906, the message gets priority delivery to the recipient. In some embodiments, that is the same as delivery, but in other embodiments, it includes a notification by SMS, a highlighting of the email, a reordering of the email inbox to highlight the email, or any other appropriate mechanism. At 907, the email is delivered.

Figure 10:
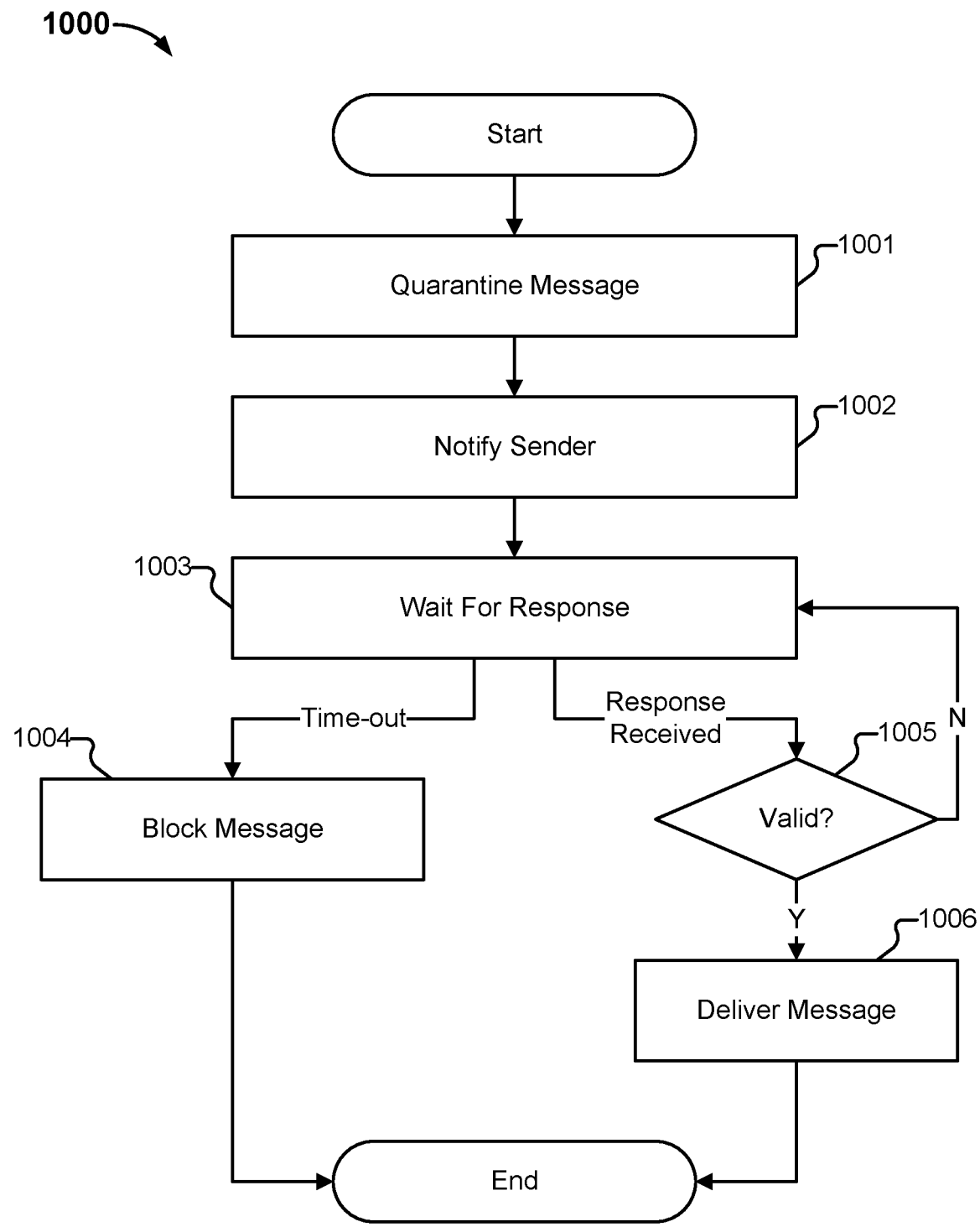
FIG. 10 illustrates an embodiment of a quarantine process using a secondary channel for release of quarantined messages.

FIG. 10 illustrates an embodiment of a quarantine process using a secondary channel for release of quarantined messages. In some embodiments, the example process 1000 of FIG. 10 is executed using the scam detection system described herein (e.g., scam detection system 100). At 1001, an email message is quarantined. At 1002, the sender of the quarantined message is notified using a secondary channel, such as SMS. At 1003, the system awaits a response to the notification. If there is a time-out, i.e., there is no response before a threshold time has elapsed, where this threshold time, as one example, is 5 days, then the process continues to 1004; if there is a response, then the process continues to 1005. At 1005, it is determined whether the response is valid. For example, a valid response to the notification can include a PIN, the word "yes" or an empty response, and an invalid response another message. If the response is not valid, then the process proceeds to 1003; otherwise to 1006. At 1004, the quarantined message is removed from quarantine and blocked. At 1006, the quarantined message is removed from quarantine and delivered to the recipient. In addition, a message can be delivered to the recipient by an action by the recipient, as will be described below in conjunction with FIG. 11.

Figure 11:
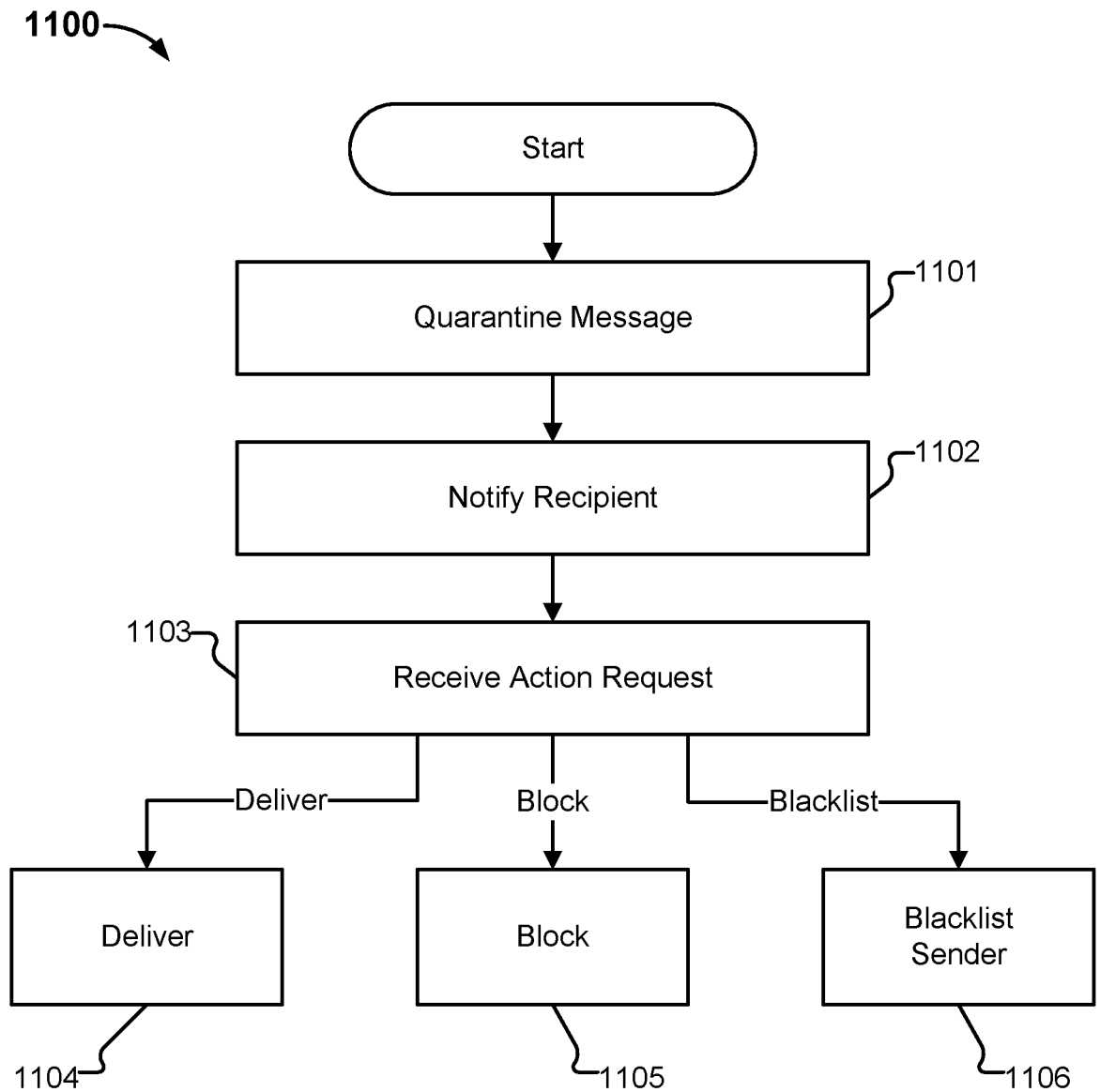
FIG. 11 illustrates an example embodiment of a process for processing of a quarantined email message.

FIG. 11 illustrates an example embodiment of a process for processing of a quarantined email message. In some embodiments, the example process 1100 of FIG. 11 is executed using the scam detection system described herein (e.g., scam detection system 100). At 1101, the email is quarantined. At 1102, the recipient is notified that she has a quarantined message. This notification can include information about one or more quarantined messages, including the sender, portions of the message, and information about why the message was quarantined. For example, the notification can specify that there are two quarantined messages; when they arrived; the email addresses and display names of the senders; the subject lines of the messages; and alerts specifying that the first message was sent from a sender with a name similar to a trusted sender, and the second message has signs of having been sent from a hacked email account. At 1103, the system receives an action request from a user. If this is "deliver" then the process continues to 1104, where the message is removed from quarantine and delivered. If the action request is "block" then the message is removed from quarantine and blocked. If the action request is "blacklist" then the sender is blacklisted. Note that if a message is removed from the quarantine in the process illustrated in FIG. 11, then it does not matter whether the sender responds with a valid response at 1005 of FIG. 10—since the message has been removed, it can no longer be delivered at 1006 of FIG. 10.

Figure 12:
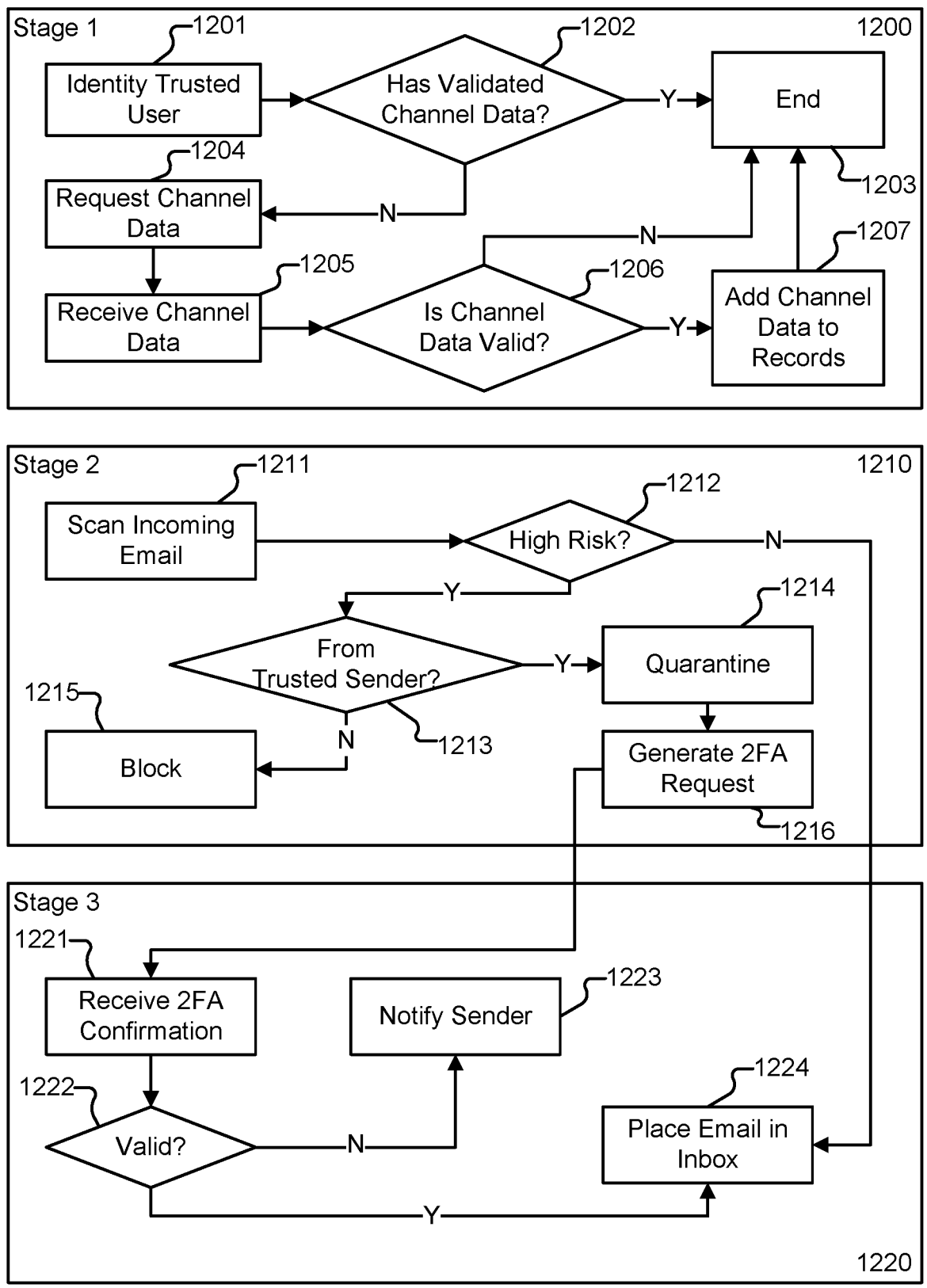
FIG. 12 illustrates an example of the three stages in one embodiment of a 2FA confirmation process.

FIG. 12 illustrates an example of the three stages in one embodiment of a 2FA confirmation process. In some embodiments, the example process of FIG. 12 is executed using the scam detection system described herein (e.g., scam detection system 100). Stage 1 corresponds to unit 1200, stage 2 to unit 1210, and stage 3 to unit 1220. At 1201, the system identifies a trusted user and goes to 1202. At 1202, it is determined whether the trusted user has validated channel data associated with his or her record kept by the system. If this is true, then the process continues to 1203, otherwise to 1204. At 1204, the system generates a request for channel data. In one embodiment, this request is sent to the trusted user by email. In another embodiment, the channel data is requested from a user associated with an account receiving at least one email from the trusted user. In yet another embodiment, storage maintained by the system or its users is searched to identify channel data associated with the trusted user. At 1205, channel data is received in response to the request, and at 1206 it is verified whether the channel data is valid. In one embodiment, this involves sending an SMS to the trusted user using the newly received channel data as a recipient address for the SMS, where the SMS contains a code that is generated by the system.

Further, an email can be sent to the trusted user, containing a hyperlink. When the user clicks on the hyperlink, he or she comes to a webpage controlled by the system, in which the code sent by SMS can be input. If this is correctly input, then the channel data is considered valid. In another embodiment, a user associated with the protected organization is asked to confirm that the contact information is valid. If this is done, then the channel data is considered valid. If the channel data is considered valid in 1206, then the process continues to 1207, otherwise to 1203. At 1203, the attempt to register channel data ends for now. At 1207, the validated channel data is added to a record associated with the trusted user.

1210 corresponds to stage 2. At 1211, the system scans an incoming email and proceeds to 1212. At 1212, it is determined whether the email is high risk. If that is true, then the process continues to 1213, otherwise to 1224. At 1213, it is determined whether the email is from a trusted sender. If yes, then the process proceeds to 1214, otherwise to 1215. At 1215, the email is blocked. At 1214, the email is quarantined, after which the system proceeds to 1216, where a 2FA confirmation request is attempted to be generated. An example request is "Did you send an email to Alice with subject 'Here is my invoice'? If so, respond Y to this SMS. To report abuse, respond N." If there is valid channel data associated with the sender of the email, then the 2FA confirmation request is generated and sent to the valid channel address, after which the system proceeds to 1221. If there is no valid channel data associated with the sender, then a registration request similar to that at 1204 is generated and transmitted. After it has been received and determined valid, the email is marked up and moved to the inbox (not shown in the figure).

1220 corresponds to stage 3. At 1221, the system received a response to the 2FA confirmation request; this response is referred to as the confirmation. At 1222, it is determined whether the confirmation is valid. For example, assume the request sent at 1216 is "Did you send an email to Alice with subject 'Here is my invoice'? If so, respond Y to this SMS. To report abuse, respond N." In this case, the response "Y" is considered a valid response. If the response is valid, then the process continues to 1224, where the email is moved from quarantine to the recipient inbox(es). If the responds is not valid, then at 1223, an optional notification is sent to the apparent sender of the email. In addition, the system can flag the email as abusive, and this flagged email can be forwarded to an admin, or used for system training purposes, or both. In some embodiments, the 2FA confirmation process is used to reduce the impact of spoofed BEC emails, and emails that are sent from legitimate accounts of trusted people, where these accounts have been taken over by scammers, e.g., using phishing attacks.

In an alternative embodiment, 2FA tokens are used instead of registered channels. In that context, stage 1 is not needed, and is replaced by the distribution of the 2FA tokens. Furthermore, at 1216, a message is sent to the email of the sender, asking, for example, the sender to click on a link and enter the code from the 2FA token. That value is received at 1221, and validated at 1222. In some embodiments, a valid response is one that matches the token output. If the response is not valid, the sender is notified to try again at 1223, after which the system gets ready to receive a new confirmation at 1221.

Figure 13:
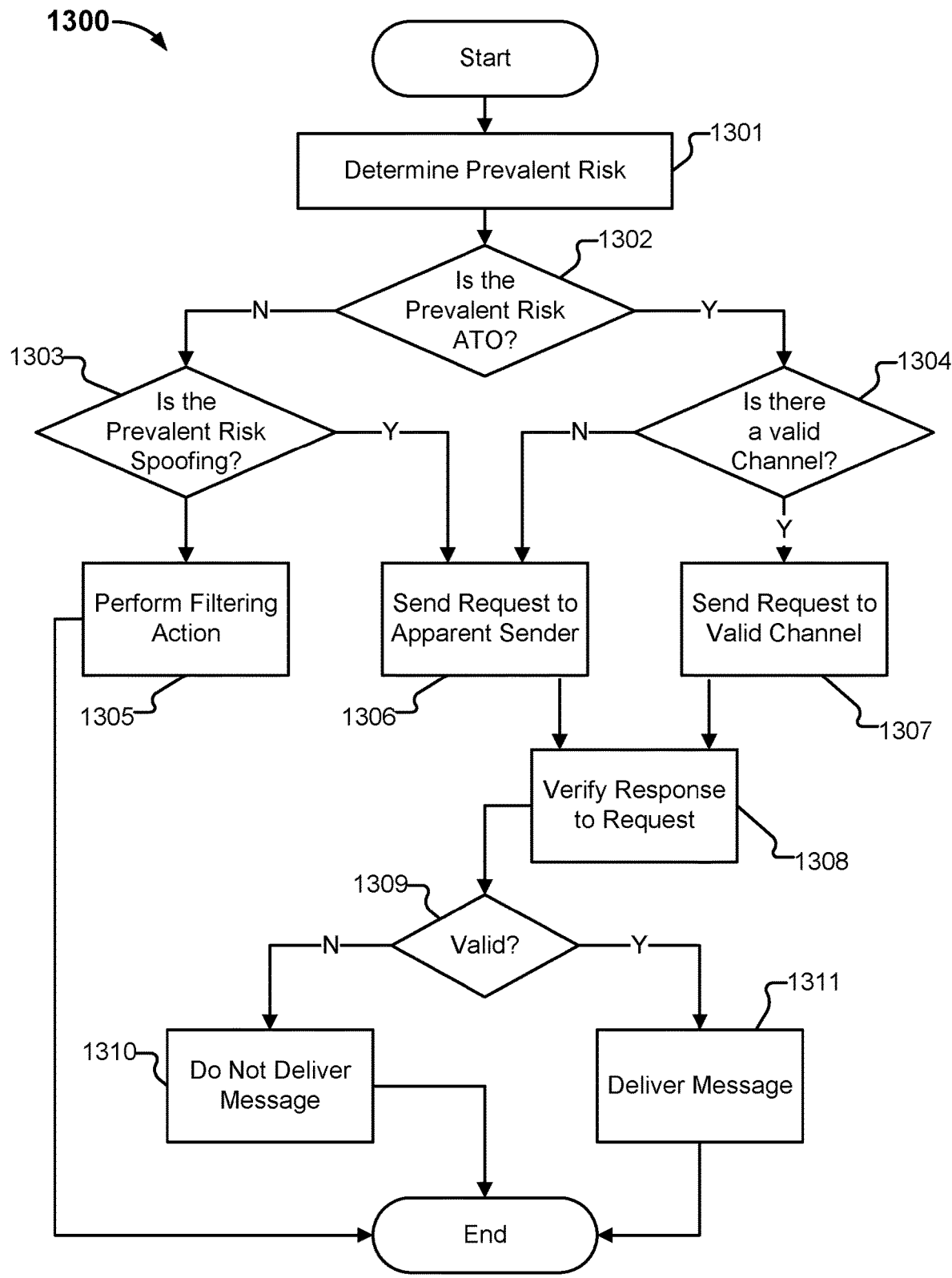
FIG. 13 illustrates an example embodiment of processing associated with sending a request to an account associated with the apparent sender of an email.

FIG. 13 illustrates an example embodiment of processing associated with sending a request to an account associated with the apparent sender of an email. In some embodiments, the example process 1300 of FIG. 13 is executed using the scam detection system described herein (e.g., scam detection system 100). At 1301, the prevalent risk of the email is determined. At 1302, it is determined whether the prevalent risk is account take-over. If it is, then the process continues to 1304, otherwise to 1303. At 1303, it is determined whether the prevalent risk is spoofing. If it is, then the process proceeds to 1306, otherwise 1305. At 1305, a filtering action is performed based on the identified prevalent risk and the severity of this risk. Example actions include blocking the message, placing the message in quarantine, marking the message up, and notifying an admin of the message, or combinations of such actions. At 1306, a request is sent to the apparent sender of the message. Example requests are shown in FIGS. 14 and 15. At 1304, it is determined whether there is a valid channel associated with the sender. If there is, then the process continues to 1307, otherwise to 1306. At 1307, a request is sent to an address that is a valid channel associated with the apparent sender of the message. An example request is shown in FIG. 15. At 1308, the system verifies the response to the request, whether this was sent at 1306 or 1307. If the response is determined to be valid at 1309, then the process proceeds to 1311, otherwise 1310. At 1310, the message is not delivered, but is preferably blocked. At 1311, the message is delivered. In one embodiment, all or some of all blocked messages are sent to an admin or a security agent for further processing. The decision of whether to forward blocked messages to an admin, to a security agent, to both or neither depends on the configuration and on the flow in which the message was determined to be high-risk, and consequently blocked.

FIG. 14 illustrates an example embodiment of a request. In some embodiments, this type of request is sent to the apparent sender of an email that is determined to be at high risk of being spoofed. At 1401, such a request is shown. At 1401, the recipient of the request is asked to click on a hyperlink 1402 to have the email delivered. In an alternative embodiment, the recipient of the request is asked to reply to the request to have the email delivered. If the recipient of the request clicks on 1402 then a webpage 1410 is shown to him or her. In this, the person is asked to enter a secondary email address at 1411 and a phone number at 1412. These are referred to herein as channel addresses. After receiving channel addresses, the system initiates a validation attempt. In some embodiments, this involves sending a message to each of the received channel addresses, asking the recipient to click on a hyperlink or respond in order to have the channel address validated. In some embodiments, the hyperlink is unique, allowing the system to determine the account associated with the click. Similarly, a response to the request by clicking "reply" allows the system to identify who responded.

FIG. 15 illustrates an example embodiment of a request that is a variation of the request in FIG. 14. The request at 1501 is sent in response to an email being determined to be at high risk to be associated with spoofing or with an account take-over. If the recipient of the request 1501 clicks on the hyperlink 1502 or replies to the request 1501 with a message containing the word "yes" then the email associated with high risk is delivered to its recipient.

Figure 16:
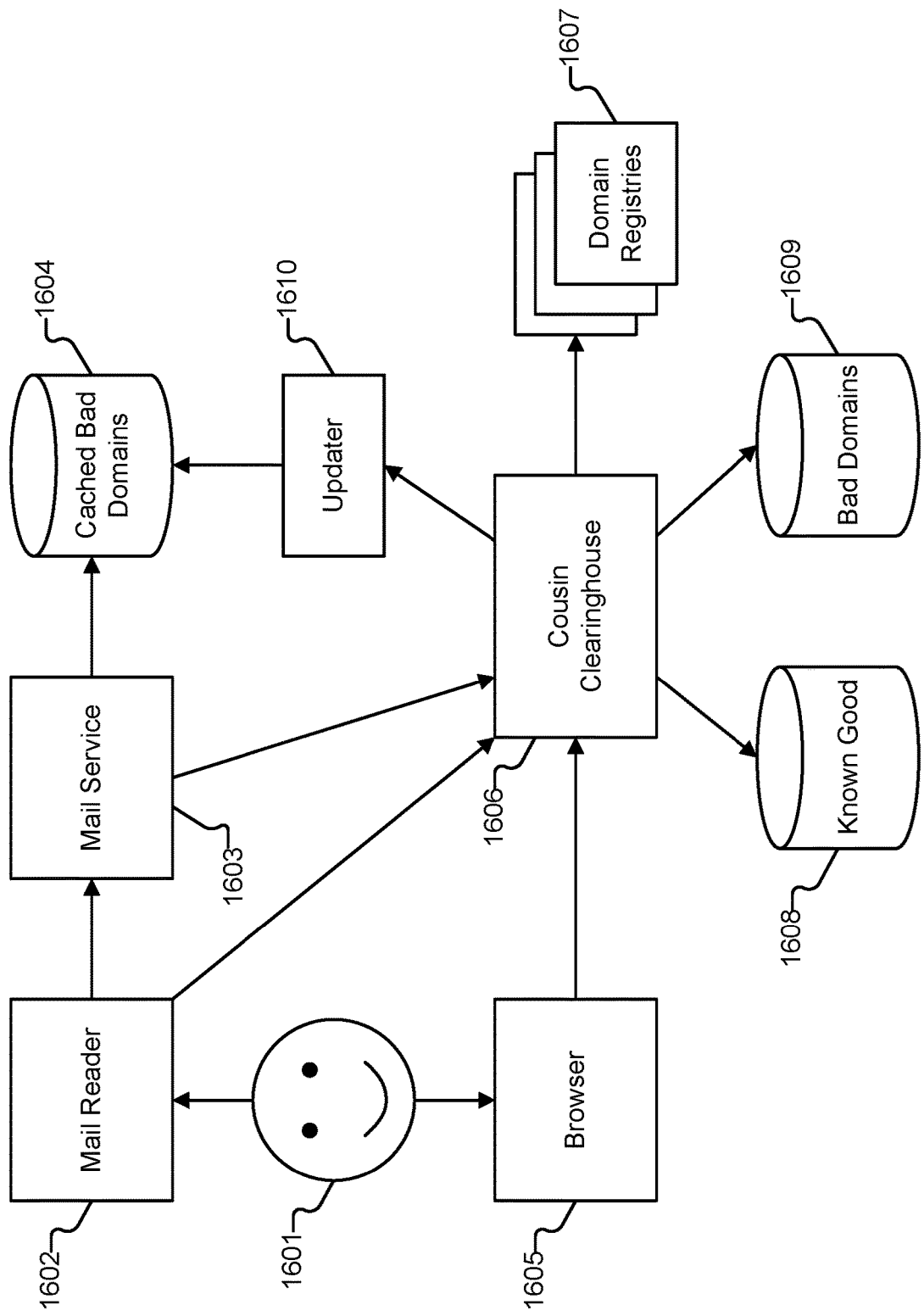
FIG. 16 illustrates an example embodiment of a cousin clearinghouse.

FIG. 16 illustrates an example embodiment of a cousin clearinghouse. In some embodiments, the example cousin clearinghouse shown here is a portion of the scam detection system described herein (e.g., an alternate view of scam detection system 100 of FIG. 1). In the example of FIG. 16, the Cousin Clearinghouse (1606) polls Domain Registries (1607) to identify domains that may be close copies of Known Good (1608) domains and scores them. Domains that exceed a scam threshold are added to the Bad Domains (1609) repository. The Cousin Clearinghouse securely refreshes Cached Bad Domains (1604) list at a mail service provider through an Updater (1610) that resides at the mail service provider. The mail service (1603) reads the Cached Bad Domains (1604) and applies domain filters to the incoming or outgoing mail stream. Users (1601) can safely access the Internet through a web browser (1605) that checks URLs against the Cousin Clearinghouse (1606) and blocks access to bad domains. Users (1601) read email from a mail server (1603) through a mail reader (1602). If a user (1601) finds a suspect domain they can report it to the Cousin Clearinghouse (1606) via a communications channel such as email. In some embodiments, a Mail Service (1603) can automatically send suspect domains to the Cousin Clearinghouse when they are found by other filters.

In one embodiment, the browser maintains a cache of bad domains to reduce the traffic to the Cousin Clearinghouse.

In one embodiment, a score is maintained for each Bad Domain. In some embodiments, smart filters at the mail server or the browser can decide appropriate actions based on this score. For example, additional information such as suspicious email body content or the user's browser security settings can be used to determine whether the content is blocked or a warning is shown.

In one embodiment the known good list entries with scores can also be provided in addition or instead of the bad list. This allows refined decision making by the mail server or browser. For example, if a domain is known to be good rather than unknown, the content is less likely to be scam or even spam.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detection of business email compromise, comprising:
 a processor configured to:
  automatically determine that a first party is trusted by a second party, based on at least one of determining that the first party and second party belong to the same organization and that at least a threshold number of messages have been transmitted between the second party and the first party during a period of time that exceeds a threshold time;
  receive a message addressed to the second party from a third party, the third party distinct from the first party;
  perform a risk determination of the received message to determine if the received message poses a risk by determining that a display name of the first party and a display name of third party are the same or that a domain name of the first party and a domain name of the third party are similar, wherein similarity is determined based on having a string distance below a first threshold, or being conceptually similar based on a list of conceptually similar character strings;
  responsive to the first party being trusted by the second party, and the received message is determined to pose a risk, automatically perform a security action and a report generation action without having received any user input from a user associated with the second party in response to the message, wherein the security action comprises marking the message up with a warning or quarantining the message, wherein the report generating action comprises including information about the received message in a report accessible to an admin of the system; and
 a memory coupled to the processor and configured to provide the processor with instructions.

2. The system of claim 1 wherein the risk determination is further based at least in part on at least one of an indication of spoofing, an indication of account takeover, a presence of a reply-to address, a determination of an abnormal delivery path, and a geographic inconsistency.

3. The system of claim 1 wherein the risk determination is further based on at least one of: detection of a new signature file, detection of a new display name, detection of high-risk email content, detection of an abnormal delivery path, and based on analysis of attachments.

4. The system of claim 1 wherein an address associated with the first party is a secondary communication channel associated with at least one of the first party and an admin associated with the first party.

5. The system of claim 1 wherein the security action further comprises transmitting a confirmation request to an address associated with the first party, the confirmation request comprising at least a portion of the message, wherein the message is delivered to the second party based on verification of information received in response to the confirmation request.

6. The system of claim 1 wherein the security action further comprises modifying the message by at least one of:
 i) changing the display name based on a schedule or when an event occurs, ii) adding Unicode characters in the display name, iii) adding a title of the recipient to the display name, and iv) recording when the display name was modified to determine how old a connection is to the first party.

7. The system of claim 1 wherein the security action comprises at least one of: initiating a multi-factor authentication verification, modifying the display name of the message, transmitting a notification or a warning to an address associated with the second party, and transmitting a confirmation request to an address associated with the first party, the confirmation request comprising at least a portion of the message.

8. The system of claim 7 wherein a confirmation in response to the confirmation request comprises at least one of entering a code and clicking on a link included in the confirmation request.

9. The system of claim 8 wherein information associated with the clicking on the link is collected, wherein the information comprises at least one of an IP address, a cookie, and browser version information.

10. A non-monotonic system for determining whether an electronic message is deceptive, comprising:
 a processor configured to:
  automatically determine whether a first party is trusted by a second party, based on at least one of determining that the first party and second party belong to the same organization and that at least a threshold number of messages have been transmitted between the second party and the first party during a period of time that exceeds a threshold time;
  receive a message addressed to the second party from a third party, the third party distinct from the first party;
  perform a risk determination of the received message to determine if the received message poses a risk by determining that a display name of the first party and a display name of third party are the same or that a domain name of the first party and a domain name of the third party are similar, wherein similarity is determined based on having a string distance below a first threshold, or being conceptually similar based on a list of conceptually similar character strings;

responsive to the first party being trusted by the second party, and the received message is determined to pose a risk, determine that the message is deceptive;

responsive to a determination that the first party is not trusted by the second party, determine that the message is not deceptive;

responsive to the message being found deceptive, automatically perform a security action and a report generation action without having received any user input from a user associated with the second party in response to the message, wherein the security action comprises marking the message up with a warning or quarantining the message, wherein the report generating action comprises including information about the received message in a report accessible to an admin of the system; and responsive to the message being found not deceptive, deliver the message to the second party; and a memory coupled to the processor and configured to provide the processor with instructions.

11. A method for detection of business email compromise, comprising:

automatically determining that a first party is trusted by a second party, based on at least one of determining that the first party and second party belong to the same organization and that at least a threshold number of messages have been transmitted between the second party and the first party during a period of time that exceeds a threshold time, and by evaluating a transitive closure algorithm;

receiving a message addressed to the second party from a third party, the third party distinct from the first party;

performing a risk determination of the received message to determine if the received message poses a risk by determining that a display name of the first party and a display name of third party are the same or that a domain name of the first party and a domain name of the third party are similar, wherein similarity is determined based on having a string distance below a first threshold, or being conceptually similar based on a list of conceptually similar character strings;

responsive to the first party being trusted by the second party, and the received message is determined to pose a risk, automatically performing a security action and a report generation action without having received any user input from a user associated with the second party in response to the message, wherein the security action comprises marking the message up with a warning or quarantining the message, wherein the report generating action comprises including information about the received message in a report accessible to an admin of the system.

12. The method of claim 11 further comprising basing the risk determination at least in part on at least one of an indication of spoofing, an indication of account takeover, a presence of a reply-to address, a determination of an abnormal delivery path, and a geographic inconsistency.

13. The method of claim 11 further comprising generating the risk determination based on at least one of: detection of a new signature file, detection of a new display name, detection of high-risk email content, detection of an abnormal delivery path, and an analysis of attachments.

14. The method of claim 11 further comprising determining an address associated with the first party is a secondary communication channel associated with at least one of the first party and an admin associated with the first party.

15. The method of claim 11 wherein the security action further comprises transmitting a confirmation request to an address associated with the first party, the confirmation request comprising at least a portion of the message, the method further comprising enabling a confirmation in response to the confirmation request to comprise at least one of entering a code and clicking on a link included in the confirmation request.

16. The method of claim 15 further comprising collecting information associated with the clicking on the link, wherein the information comprises at least one of an IP address, a cookie, and browser version information.

17. The method of claim 11 further comprising delivering the message to the second party based on verification of information received in response to the confirmation request.

18. A non-monotonic method for determining whether an electronic message is deceptive, comprising:

automatically determining whether a first party is trusted by a second party, based on at least one of determining that the first party and second party belong to the same organization and that at least a threshold number of messages have been transmitted between the second party and the first party during a period of time that exceeds a threshold time, and by evaluating a transitive closure algorithm;

receiving a message addressed from a third party distinct from the first party and addressed to the second party;

performing a risk determination of the received message to determine if the received message poses a risk by determining that a display name of the first party and a display name of third party are the same or that a domain name of the first party and a domain name of the third party are similar, wherein similarity is determined based on having a string distance below a first threshold, or being conceptually similar based on a list of conceptually similar character strings;

responsive to the first party being trusted by the second party and the received message is determined to pose a risk, determining that the message is deceptive;

responsive to a determination that the first party is not trusted by the second party, determining that the message is not deceptive;

responsive to the message being found deceptive, automatically performing a security action and a report generation action without having received any user input from a user associated with the second party in response to the message, wherein the security action comprises marking the message up with a warning or quarantining the message, wherein the report generating action comprises including information about the received message in a report accessible to an admin of the system; and responsive to the message being found not deceptive, delivering the message to the second party.

* * * * *

UNITED STATES PATENT AND TRADEMARK OFFICE
CERTIFICATE OF CORRECTION

PATENT NO. : 10,721,195 B2
APPLICATION NO. : 15/414489
DATED : July 21, 2020
INVENTOR(S) : Bjorn Markus Jakobsson It is certified that error appears in the above-identified patent and that said Letters Patent is hereby corrected as shown below:

In the Claims

Column 47: Line 51, replace "received message" with --message--.

Column 47: Line 52, replace "received message" with --message--.

Column 47: Line 61, replace "received message" with --message--.

Column 48: Line 2, replace "received message" with --message--.

Column 48: Line 64, replace "received message" with --message--.

Column 48: Line 65, replace "received message" with --message--.

Column 49: Line 7, replace "received message" with --message--.

Column 49: Line 20, replace "received message" with --message--.

Column 49: Line 38, replace "received message" with --message--.

Column 49: Line 39, replace "received message" with --message--.

Column 49: Line 48, replace "received message" with --message--.

Column 49: Line 56, replace "received message" with --message--.

Column 50: Line 37, replace "received message" with --message--.

Column 50: Line 38, replace "received message" with --message--.

Signed and Sealed this
First Day of September, 2020

Andrei Iancu
*Director of the United States Patent and Trademark Office*

Column 50: Line 47, replace "received message" with --message--.

Column 50: Line 61, replace "received message" with --message--.